(12) United States Patent
Koizumi et al.

(10) Patent No.: US 11,356,656 B2
(45) Date of Patent: Jun. 7, 2022

(54) SIGNAL PROCESSING DEVICE, SIGNAL PROCESSING METHOD, AND SIGNAL PROCESSING SYSTEM

(71) Applicant: SONY SEMICONDUCTOR SOLUTIONS CORPORATION, Kanagawa (JP)

(72) Inventors: Makoto Koizumi, Kanagawa (JP); Masaki Murozuka, Kanagawa (JP); Masakatsu Fujimoto, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/978,324

(22) PCT Filed: Dec. 10, 2018

(86) PCT No.: PCT/JP2018/045314
§ 371 (c)(1),
(2) Date: Sep. 4, 2020

(87) PCT Pub. No.: WO2019/176194
PCT Pub. Date: Sep. 19, 2019

(65) Prior Publication Data
US 2021/0006777 A1    Jan. 7, 2021

(30) Foreign Application Priority Data

Mar. 13, 2018  (JP) .............................. JP2018-045378

(51) Int. Cl.
*H04N 17/00*   (2006.01)
*H04N 5/369*   (2011.01)
*H04N 5/378*   (2011.01)

(52) U.S. Cl.
CPC ........... *H04N 17/002* (2013.01); *H04N 5/378* (2013.01); *H04N 5/379* (2018.08)

(58) Field of Classification Search
CPC ....... H04N 17/002; H04N 5/379; H04N 5/378
See application file for complete search history.

(56) References Cited

U.S. PATENT DOCUMENTS

2004/0117702  A1 *  6/2004  Meany ............... G01R 31/3167
                                              714/726
2008/0197268  A1    8/2008  Kameda
(Continued)

FOREIGN PATENT DOCUMENTS

JP    2005-093487 A    4/2005
JP    2008-205905 A    9/2008
(Continued)

OTHER PUBLICATIONS

International Search Report and Written Opinion of PCT Application No. PCT/JP2018/045314, dated Feb. 12, 2019, 08 pages of ISRWO.

*Primary Examiner* — Michael E Teitelbaum
(74) *Attorney, Agent, or Firm* — Chip Law Group

(57) ABSTRACT

To enable detection of occurrence of abnormality in a more preferable manner when the abnormality occurs in signal processing applied to pixel signals. A signal processing device including: a signal processing unit that performs signal processing on pixel signals; and a data generation unit that associates first test data based on first processing, second test data based on second processing, and valid data obtained by performing the second processing on the pixel signals corresponding to a second frame after a first frame to generate frame data corresponding to the second frame, in which, the first processing is the signal processing for generating the valid data in the first frame; the second processing is the signal processing for generating the valid (Continued)

data in the second frame; and presence or absence of abnormality in the signal processing is diagnosed on the basis of the first test data associated with the frame data corresponding to the first frame, and the first test data associated with the frame data corresponding to the second frame.

23 Claims, 18 Drawing Sheets

(56) References Cited

U.S. PATENT DOCUMENTS

| | | | |
|---|---|---|---|
| 2011/0019030 A1 | 1/2011 | Shoyama | |
| 2013/0070135 A1* | 3/2013 | Bahukhandi | H04N 5/3742 348/300 |
| 2016/0111463 A1* | 4/2016 | Borthakur | H01L 27/14687 348/294 |
| 2016/0117557 A1* | 4/2016 | Bettagere | G06T 7/001 382/100 |
| 2016/0301923 A1 | 10/2016 | Ichige | |

FOREIGN PATENT DOCUMENTS

| | | |
|---|---|---|
| JP | 2009-188454 A | 8/2009 |
| JP | 2010-020437 A | 1/2010 |
| JP | 2011-029725 A | 2/2011 |
| JP | 2011-041033 A | 2/2011 |
| JP | 2016-008970 A | 1/2016 |
| WO | 2015/104915 A1 | 7/2015 |

* cited by examiner

SIGNAL PROCESSING DEVICE, SIGNAL PROCESSING METHOD, AND SIGNAL PROCESSING SYSTEM

CROSS REFERENCE TO RELATED APPLICATIONS

This application is a U.S. National Phase of International Patent Application No. PCT/JP2018/045314 filed on Dec. 10, 2018, which claims priority benefit of Japanese Patent Application No. JP 2018-045378 filed in the Japan Patent Office on Mar. 13, 2018. Each of the above-referenced applications is hereby incorporated herein by reference in its entirety.

TECHNICAL FIELD

The present disclosure relates to a signal processing device, a signal processing method, and a signal processing system.

BACKGROUND ART

As a solid-state imaging device, an amplification type solid-state imaging device represented by a MOS image sensor such as a complementary metal oxide semiconductor (CMOS) is known. Additionally, a charge transfer type solid-state imaging device represented by a charge coupled device (CCD) image sensor is known. These solid-state imaging devices are widely used in digital still cameras, digital video cameras, and the like. In recent years, MOS image sensors have often been used as solid-state imaging devices mounted on mobile devices such as camera-equipped mobile phones and personal digital assistants (PDAs), because of their low power supply voltage in terms of power consumption and the like.

Additionally, with the development of various recognition technologies using captured images, application of the solid-state imaging device has also diversified. Particularly in recent years, there have been cases where the solid-state imaging device is applied even to a moving body such as a vehicle, to implement a function for the moving body to recognize a pedestrian, another moving body, or the like, for example.

CITATION LIST

Patent Document

Patent Document 1: Japanese Patent Application Laid-Open No. 2016-008970

SUMMARY OF THE INVENTION

Problems to be Solved by the Invention

Incidentally, in a device such as a vehicle that requires higher reliability for operation, in order to achieve functional safety such as fail-safe, a mechanism for detecting occurrence of a failure when the failure occurs in some units is required in some cases. For example, Patent Document 1 discloses an example of a technology related to detection of a failure in a sensor system, as an example of a technology related to failure detection applicable to a vehicle or the like.

Due to such a background, a solid-state imaging device is also required to adopt a technology for detecting the occurrence of a failure when the failure occurs in some parts of the solid-state imaging device. In particular, a solid-state imaging device may be provided with a signal processing unit for performing various signal processing on pixel signals according to the light reception result of each pixel. In such a solid-state imaging device, an obtained image may change depending on the content of the signal processing. For this reason, as an example of a mechanism for detecting abnormality in a solid-state imaging device, a mechanism that enables detection of occurrence of abnormality when the abnormality occurs in signal processing applied to pixel signals is required.

Hence, the present disclosure proposes an example of a technology that enables detection of occurrence of abnormality in a more preferable manner when the abnormality occurs in signal processing applied to pixel signals.

Solutions to Problems

According to the present disclosure, provided is a signal processing device including: a signal processing unit that performs signal processing on pixel signals; and a data generation unit that associates first test data obtained by performing first processing on input data, second test data obtained by performing second processing on the input data, and valid data obtained by performing the second processing on the pixel signals read in a second frame after a first frame to generate frame data corresponding to the second frame, in which, the first processing is the signal processing for generating the valid data in the first frame, the second processing is the signal processing for generating the valid data in the second frame, and presence or absence of abnormality in the signal processing is diagnosed on the basis of the first test data associated with the frame data corresponding to the first frame, and the first test data associated with the frame data corresponding to the second frame.

Additionally, according to the present disclosure, provided is a signal processing method including: performing, by a computer, signal processing on pixel signals; and associating first test data obtained by performing first processing on input data, second test data obtained by performing second processing on the input data, and valid data obtained by performing the second processing on the pixel signals read in a second frame after a first frame to generate frame data corresponding to the second frame, in which the first processing is the signal processing for generating the valid data in the first frame, the second processing is the signal processing for generating the valid data in the second frame, and presence or absence of abnormality in the signal processing is diagnosed on the basis of the first test data associated with the frame data corresponding to the first frame, and the first test data associated with the frame data corresponding to the second frame.

Additionally, according to the present disclosure, provided is a signal processing system including: a signal processing unit that performs signal processing on pixel signals; a data generation unit that associates first test data obtained by performing first processing on input data, second test data obtained by performing second processing on the input data, and valid data obtained by performing the second processing on the pixel signals read in a second frame after a first frame to generate frame data corresponding to the second frame; and a diagnosis unit that diagnoses presence or absence of abnormality in the signal processing on the basis of the first test data associated with the frame data corresponding to the first frame, and the first test data associated with the frame data corresponding to the second frame, in which the first processing is the signal processing for generating the valid data in the first frame, and the second processing is the signal processing for generating the valid data in the second frame.

Effects of the Invention

As described above, according to the present disclosure, there is provided a technology that enables detection of occurrence of abnormality in a more preferable manner when the abnormality occurs in signal processing applied to pixel signals.

Note that the above-mentioned effects are not necessarily limiting, and any of the effects shown in the present specification or other effects that can be grasped from the present specification can be exerted in addition to or instead of the above-mentioned effects.

MODES FOR CARRYING OUT THE INVENTION

Figure 1:
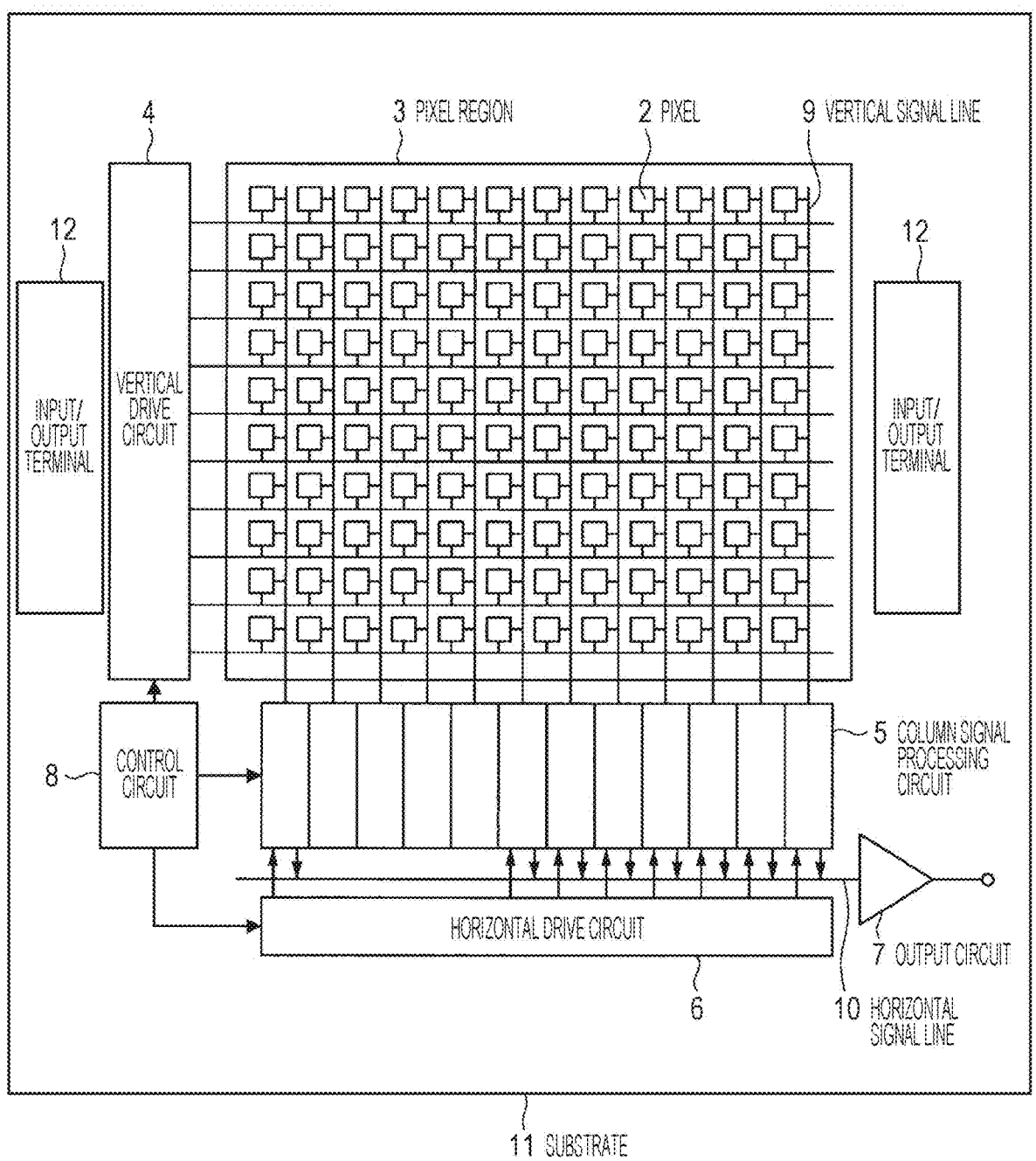
FIG. 1 is a schematic configuration diagram showing an example of a configuration of a solid-state imaging device according to an embodiment of the present disclosure.

Hereinafter, preferred embodiments of the present disclosure will be described in detail with reference to the accompanying drawings. Note that, in the present specification and the drawings, components having substantially the same functional configuration will be assigned the same reference numerals and redundant description will be omitted.

Note that the description will be given in the following order.

1. Configuration example of solid-state imaging device
1.1. Schematic configuration
1.2. Functional configuration
1.3. Circuit configuration of unit pixel
2. Study on failure detection
3. Technical features
3.1. Functional configuration
3.2. Details of failure diagnosis
3.3. Modification
4. Hardware configuration
5. Application example
6. Conclusion

1. CONFIGURATION EXAMPLE OF SOLID-STATE IMAGING DEVICE

A configuration example of a solid-state imaging device according to the present embodiment will be described below.

<1.1. Schematic Configuration>

FIG. 1 shows a schematic configuration of a CMOS solid-state imaging device as an example of a configuration of a solid-state imaging device according to an embodiment of the present disclosure. The CMOS solid-state imaging device is applied to the solid-state imaging device of each embodiment. As shown in FIG. 1, a solid-state imaging device 1 of the present example has a pixel array (so-called pixel region) 3 in which multiple pixels 2 including a photoelectric conversion unit are regularly arranged in a two-dimensional array on a semiconductor substrate 11 such as a silicon substrate, and a peripheral circuit unit. The pixel 2 includes, for example, a photodiode serving as the photoelectric conversion unit, and multiple pixel transistors (so-called MOS transistors). The multiple pixel transistors can include three transistors including a transfer transistor, a reset transistor, and an amplification transistor, for example. In addition, the multiple pixel transistors can include four transistors by adding a selection transistor. Note that an example of an equivalent circuit of a unit pixel will be described later. The pixel 2 can be configured as one unit pixel. Additionally, the pixel 2 can have a shared pixel structure. The shared pixel structure includes multiple photodiodes, multiple transfer transistors, one shared floating diffusion, and each one of other shared pixel transistors. That is, in a shared pixel, photodiodes and transfer transistors included in multiple unit pixels share one each of other pixel transistors.

The peripheral circuit unit includes a vertical drive circuit 4, a column signal processing circuit 5, a horizontal drive circuit 6, an output circuit 7, a control circuit 8, and the like.

The control circuit 8 receives an input clock and data instructing an operation mode and the like, and outputs data such as internal information of the solid-state imaging device. That is, the control circuit 8 generates a clock signal and a control signal, which serve as a reference for the operations of the vertical drive circuit 4, the column signal processing circuit 5, the horizontal drive circuit 6, and the like, on the basis of a vertical synchronization signal, a horizontal synchronization signal, and a master clock. Then, these signals are input to the vertical drive circuit 4, the column signal processing circuit 5, the horizontal drive circuit 6, and the like.

The vertical drive circuit 4 includes a shift register, for example, selects a pixel drive wiring, supplies a pulse for driving the pixel to the selected pixel drive wiring, and drives the pixels in row units. That is, the vertical drive circuit 4 selectively scans each pixel 2 of the pixel array 3 in the vertical direction sequentially in row units, and supplies the column signal processing circuit 5 with a pixel signal based on a signal charge generated according to the amount of light received in a photodiode, for example, serving as a photoelectric conversion unit of each pixel 2 through a vertical signal line 9.

The column signal processing circuit 5 is arranged for each column of the pixels 2, for example, and performs signal processing such as noise removal on signals output from the pixels 2 for one row for each pixel column. That is, the column signal processing circuit 5 performs signal processing such as CDS for removing fixed pattern noise unique to the pixel 2, signal amplification, and AD conversion. A horizontal selection switch (not shown) is provided at an output stage of the column signal processing circuit 5 so as to be connected between the column signal processing circuit 5 and a horizontal signal line 10.

The horizontal drive circuit 6 includes a shift register, for example, sequentially selects the column signal processing circuits 5 by sequentially outputting horizontal scanning pulses, and causes each of the column signal processing circuits 5 to output a pixel signal to the horizontal signal line 10.

The output circuit 7 performs signal processing on signals sequentially supplied from the column signal processing circuits 5 through the horizontal signal line 10, and outputs the processed signals. For example, only buffering may be performed in some cases, and black level adjustment, column variation correction, various digital signal processing, and the like may be performed in other cases. An input/output terminal 12 exchanges signals with the outside.

Figure 2A:
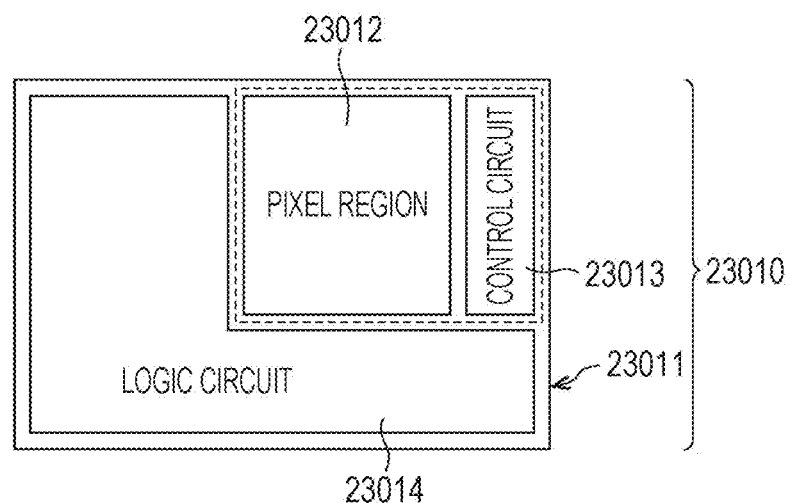
FIGS. 2A, 2B, and 2C are diagrams showing an outline of a configuration example of a stacked solid-state imaging device to which the technology according to the present disclosure can be applied.
Figure 2B:
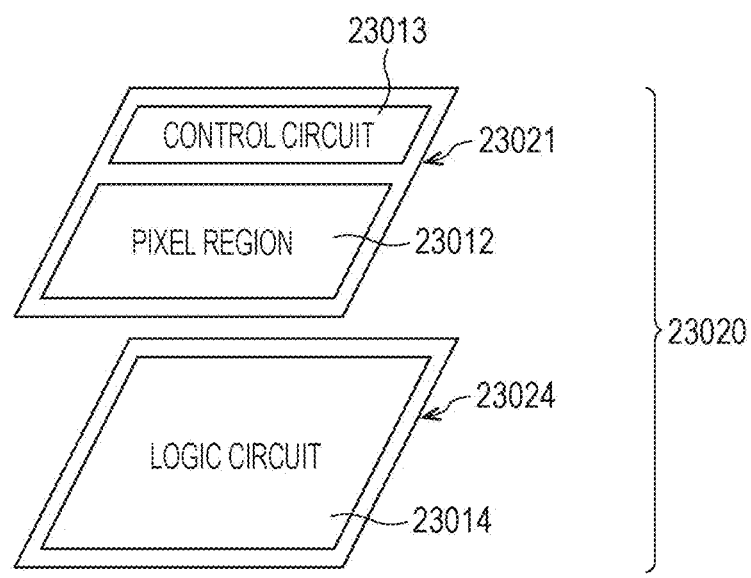
Figure 2C:
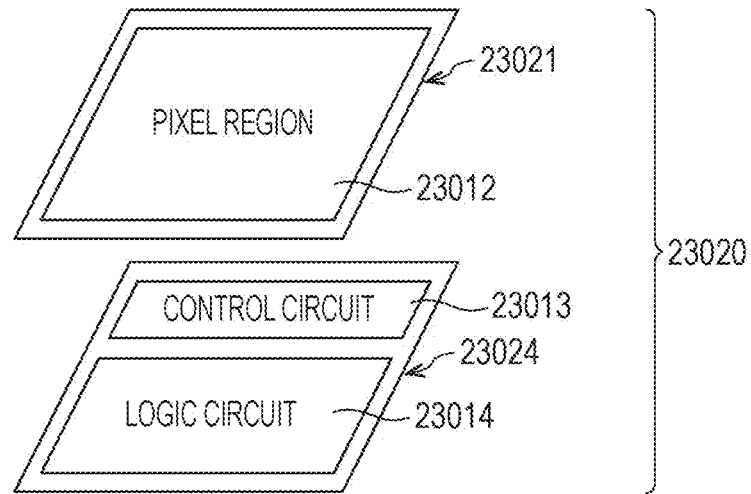

Additionally, FIGS. 2A, 2B, and 2C are diagrams showing an outline of a configuration example of a stacked solid-state imaging device to which the technology according to the present disclosure can be applied.

FIG. 2A shows a schematic configuration example of a non-stacked solid-state imaging device. As shown in FIG. 2A, a solid-state imaging device 23010 has one die (semiconductor substrate) 23011. A pixel region 23012 in which pixels are arranged in an array, a control circuit 23013 that performs driving pixels and various other control, and a logic circuit 23014 for performing signal processing are mounted on the die 23011.

of FIGS. 2B and 2C show schematic configuration examples of a stacked solid-state imaging device. As shown in FIGS. 2B and 2C, the solid-state imaging device 23020 includes two dies including a sensor die 23021 and a logic die 23024, which are stacked and electrically connected, and form one semiconductor chip.

FIG. 2B, the pixel region 23012 and the control circuit 23013 are mounted on the sensor die 23021, and the logic circuit 23014 including a signal processing circuit for performing signal processing is mounted on the logic die 23024.

FIG. 2C, the pixel region 23012 is mounted on the sensor die 23021, and the control circuit 23013 and the logic circuit 23014 are mounted on the logic die 23024.

Figure 3:
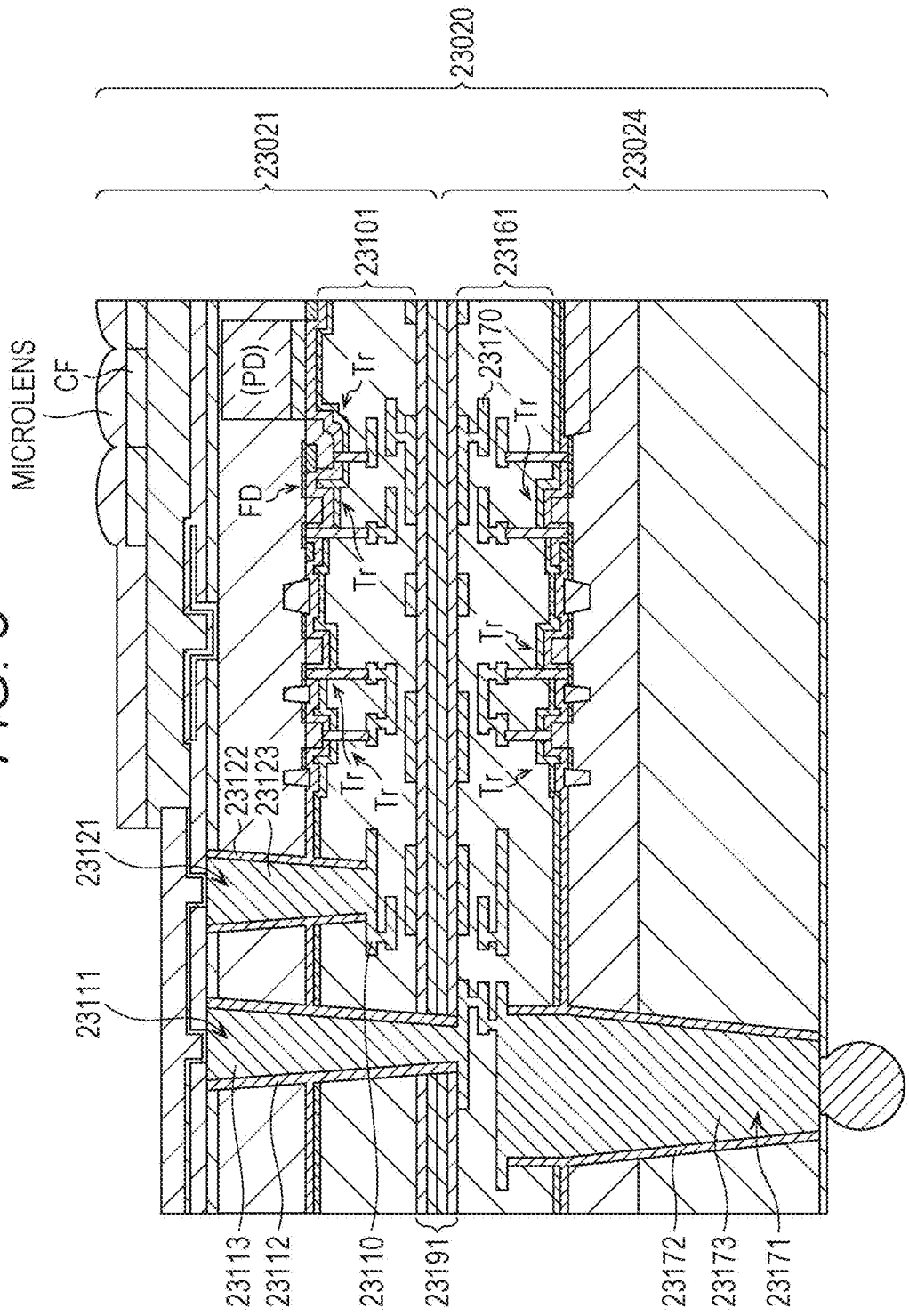
FIG. 3 is a cross-sectional view showing a first configuration example of a stacked solid-state imaging device 23020.

FIG. 3 is a cross-sectional view showing a first configuration example of the stacked solid-state imaging device 23020.

A photodiode (PD), a floating diffusion (FD), and a Tr (MOS FET) included in a pixel serving as the pixel region 23012, a Tr serving as the control circuit 23013, and the like are formed on the sensor die 23021. Moreover, a wiring layer 23101 having multiple layers, in this example, three layers of wiring 23110, is formed on the sensor die 23021. Note that the control circuit 23013 (serving as Tr) can be formed on the logic die 23024 instead of the sensor die 23021.

Tr included in the logic circuit 23014 is formed on the logic die 23024. Moreover, a wiring layer 23161 having multiple layers, in this example, three layers of wiring 23170, is formed on the logic die 23024. Additionally, the logic die 23024 has a connection hole 23171 with an insulating film 23172 formed on an inner wall surface thereof, and a connection conductor 23173 connected to the wiring 23170 and the like is embedded in the connection hole 23171.

The sensor die 23021 and the logic die 23024 are bonded together so that the wiring layers 23101 and 23161 face each other. As a result, the stacked solid-state imaging device 23020 in which the sensor die 23021 and the logic die 23024 are stacked is formed. A film 23191 such as a protective film is formed on a surface where the sensor die 23021 and the logic die 23024 are bonded.

The sensor die 23021 has a connection hole 23111 formed that penetrates the sensor die 23021 from the back side (side where light enters PD) (upper side) of the sensor die 23021 and reaches the uppermost wiring 23170 of the logic die 23024. Moreover, the sensor die 23021 has a connection hole 23121 formed in the vicinity of the connection hole 23111 so as to reach the first wiring 23110 from the back side of the sensor die 23021. An insulating film 23112 is formed on an inner wall surface of the connection hole 23111, and an insulating film 23122 is formed on an inner wall surface of the connection hole 23121. Then, connection conductors 23113 and 23123 are embedded in the connection holes 23111 and 23121, respectively. The connection conductor 23113 and the connection conductor 23123 are electrically connected on the back side of the sensor die 23021. As a result, the sensor die 23021 and the logic die 23024 are electrically connected through the wiring layer 23101, the connection hole 23121, the connection hole 23111, and the wiring layer 23161.

Figure 4:
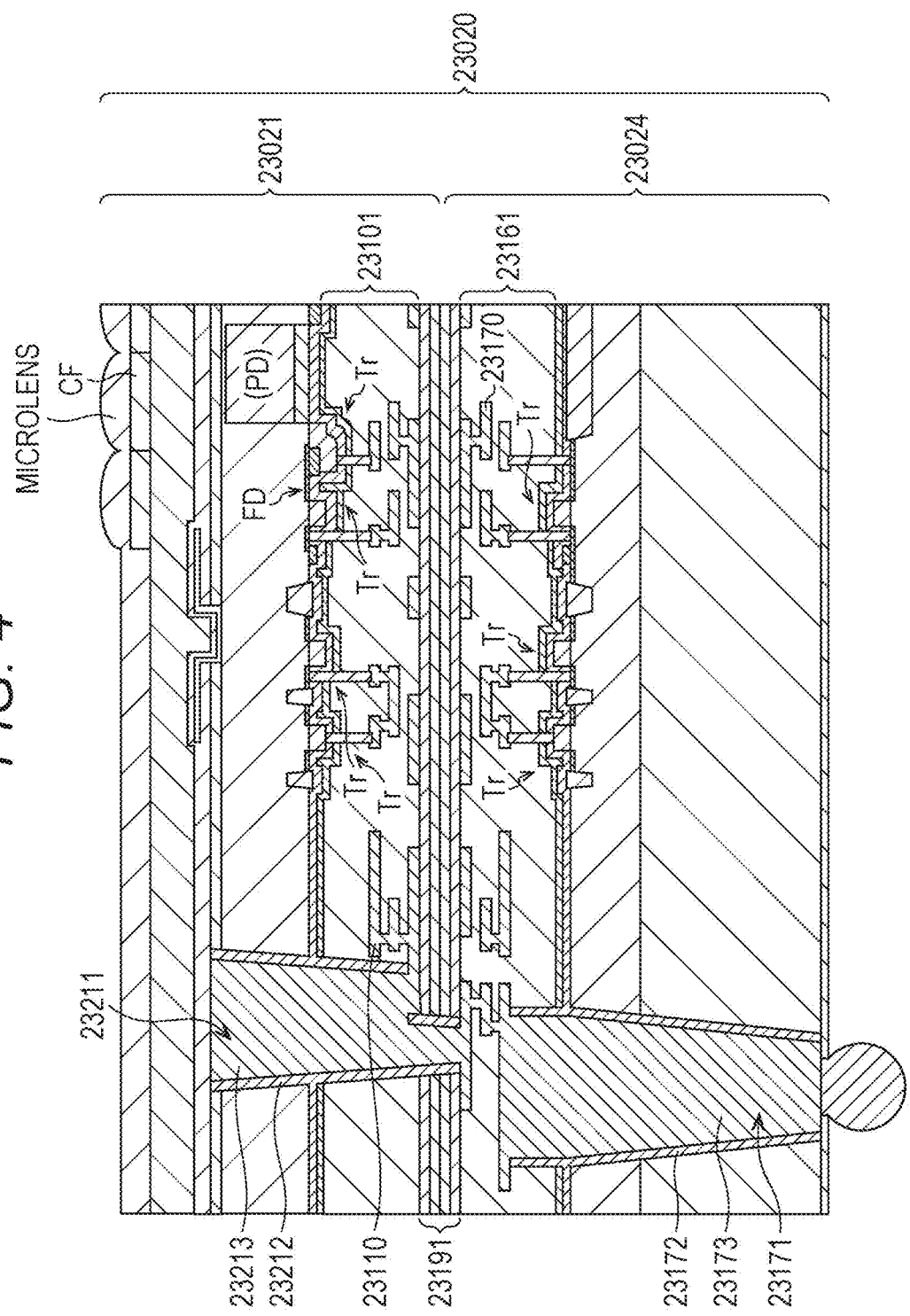
FIG. 4 is a cross-sectional view showing a second configuration example of the stacked solid-state imaging device 23020.

FIG. 4 is a cross-sectional view showing a second configuration example of the stacked solid-state imaging device 23020.

In the second configuration example of the solid-state imaging device 23020, ((wiring 23110 of) wiring layer 23101 of) the sensor die 23021 and ((wiring 23170 of) wiring layer 23161 of) the logic die 23024 are electrically connected by one connection hole 23211 formed in the sensor die 23021.

That is, in FIG. 4, the connection hole 23211 is formed so as to penetrate the sensor die 23021 from the back side of the sensor die 23021, reach the uppermost wiring 23170 of the logic die 23024, and reach the uppermost wiring 23110 of the sensor die 23021. An insulating film 23212 is formed on an inner wall surface of the connection hole 23211, and a connection conductor 23213 is embedded in the connection hole 23211. In FIG. 3 described above, the sensor die 23021 and the logic die 23024 are electrically connected by the two connection holes 23111 and 23121, but in FIG. 4, the sensor die 23021 and the logic die 23024 are electrically connected by one connection hole 23211.

Figure 5:
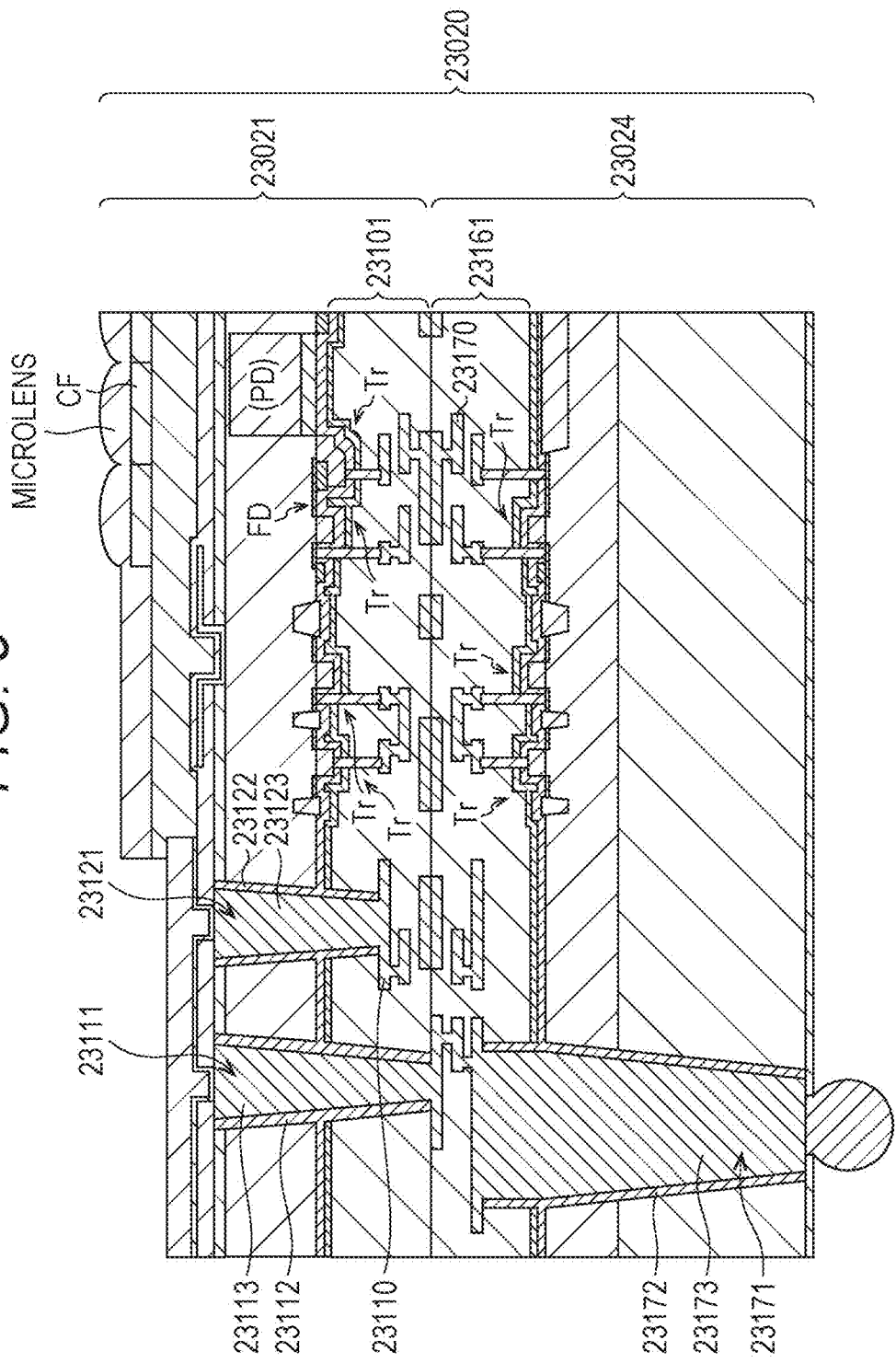
FIG. 5 is a cross-sectional view showing a third configuration example of the stacked solid-state imaging device 23020.

FIG. 5 is a cross-sectional view showing a third configuration example of the stacked solid-state imaging device 23020.

The solid-state imaging device 23020 of FIG. 5 is different from the case of FIG. 3 in which the film 23191 such as a protective film is formed on the surface where the sensor die 23021 and the logic die 23024 are bonded, in that the film 23191 such as a protective film is not formed on a surface where the sensor die 23021 and the logic die 23024 are bonded.

The solid-state imaging device 23020 of FIG. 5 is formed by superimposing the sensor die 23021 on the logic die 23024 so that the wirings 23110 and 23170 are in direct contact, performing heating while applying a required load, and directly bonding the wirings 23110 and 23170.

Figure 6:
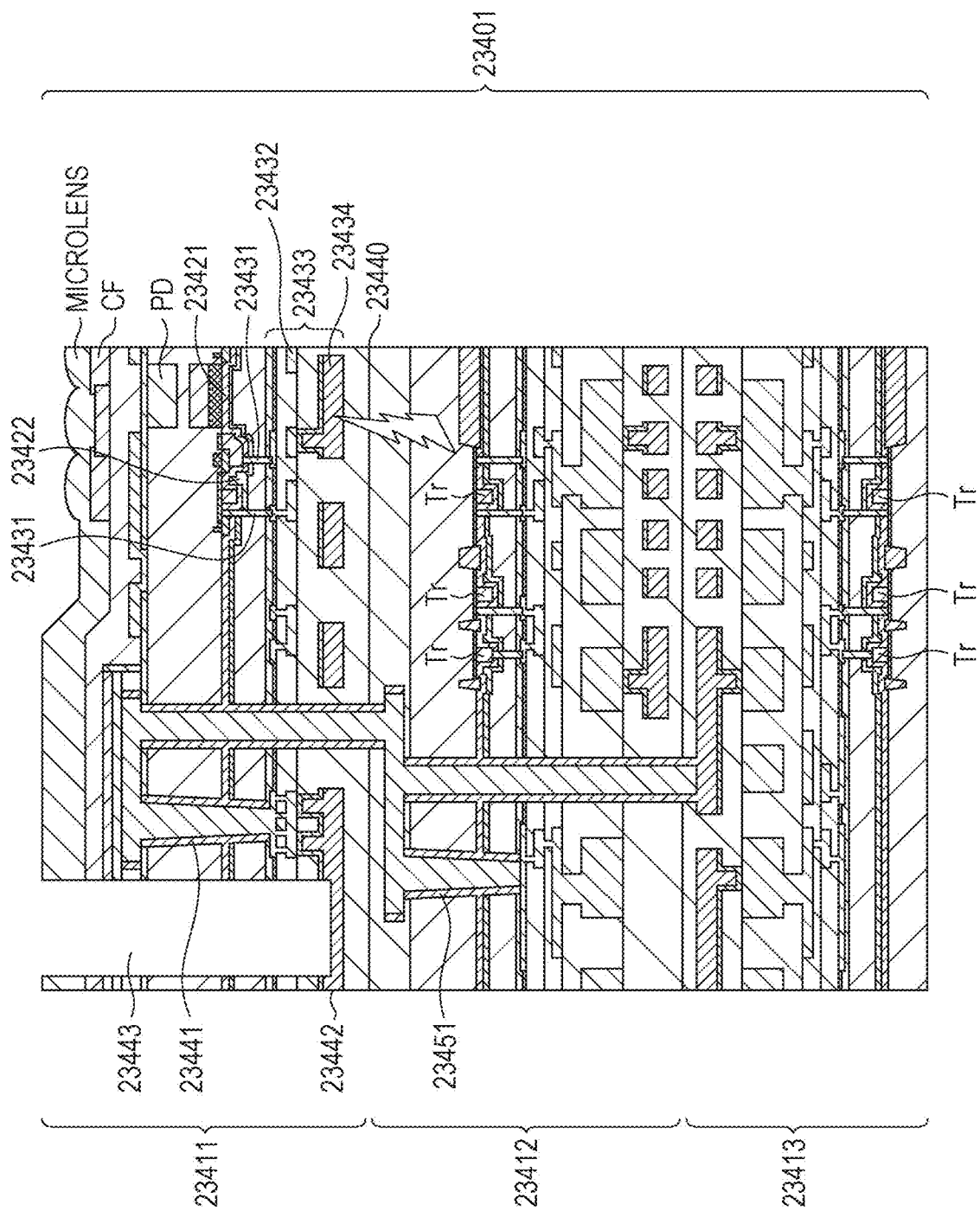
FIG. 6 is a diagram showing another configuration example of a stacked solid-state imaging device to which the technology according to the present disclosure can be applied.

FIG. 6 is a cross-sectional view showing another configuration example of a stacked solid-state imaging device to which the technology according to the present disclosure can be applied.

In FIG. 6, a solid-state imaging device 23401 has a three-layer stacked structure in which three dies including a sensor die 23411, a logic die 23412, and a memory die 23413 are stacked.

The memory die 23413 includes a memory circuit, for example, that stores data temporarily required in signal processing performed by the logic die 23412.

In FIG. 6, the logic die 23412 and the memory die 23413 are stacked in this order below the sensor die 23411. However, the logic die 23412 and the memory die 23413 can be stacked in the reverse order, that is, in the order of the memory die 23413 and the logic die 23412 below the sensor die 23411.

Note that in FIG. 6, a PD serving as a photoelectric conversion unit of the pixel and source/drain regions of pixels Tr are formed on the sensor die 23411.

A gate electrode is formed around the PD with a gate insulating film interposed therebetween, and a pixel Tr23421 and a pixel Tr23422 are formed by the gate electrode and a pair of source/drain regions.

The pixel Tr23421 adjacent to the PD is a transfer Tr, and one of the pair of source/drain regions included in the pixel Tr23421 is an FD.

Additionally, an interlayer insulating film is formed in the sensor die 23411, and a connection hole is formed in the interlayer insulating film. A connection conductor 23431 connected to the pixel Tr23421 and the pixel Tr23422 is formed in the connection hole.

Moreover, a wiring layer 23433 having multiple layers of wiring 23432 connected to each connection conductor 23431 is formed on the sensor die 23411.

Additionally, an aluminum pad 23434 serving as an electrode for external connection is formed on the lowermost wiring layer 23433 of the sensor die 23411. That is, in the sensor die 23411, the aluminum pad 23434 is formed at a position closer to a bonding surface 23440 with respect to the logic die 23412 than the wiring 23432. The aluminum pad 23434 is used as one end of a wiring related to signal input and output from and to the outside.

Moreover, a contact 23441 used for electrical connection with the logic die 23412 is formed in the sensor die 23411. The contact 23441 is connected to a contact 23451 of the logic die 23412 and also to an aluminum pad 23442 of the sensor die 23411.

Then, a pad hole 23443 is formed in the sensor die 23411 so as to reach the aluminum pad 23442 from the back side (upper side) of the sensor die 23411.

The technology according to the present disclosure can be applied to the solid-state imaging devices described above.

Note that in the examples described with reference to FIGS. 3 to 6, copper (Cu) wiring is used for various wirings, for example. Additionally, hereinafter, a configuration as shown in FIG. 5 in which wirings (e.g., wirings 23110 and 23170 shown in FIG. 5) are directly bonded between stacked sensor dies is also referred to as "Cu—Cu bonding".

<1.2. Functional Configuration>

Figure 7:
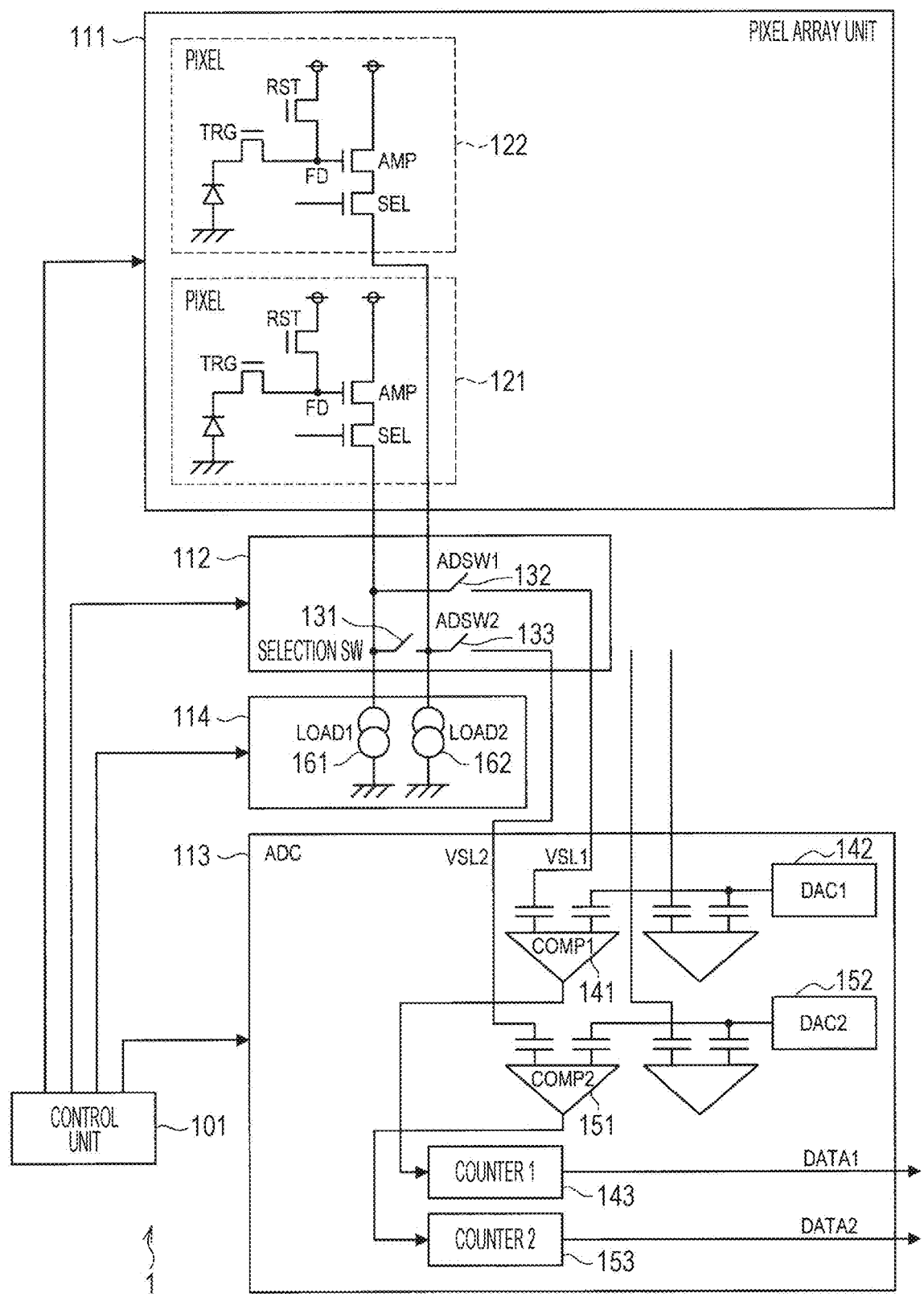
FIG. 7 is a block diagram showing an example of a functional configuration of a part of the solid-state imaging device according to the embodiment of the present disclosure.

Subsequently, an example of a functional configuration of the solid-state imaging device according to the embodiment of the present disclosure will be described with reference to FIG. 7. FIG. 7 is a block diagram showing an example of a functional configuration of a part of the solid-state imaging device according to the embodiment of the present disclosure. The solid-state imaging device 1 shown in FIG. 7 is, for example, an imaging device that captures an image of a subject and obtains digital data of the captured image, such as a complementary metal oxide semiconductor (CMOS) image sensor or a charge coupled device (CCD) image sensor.

As shown in FIG. 7, the solid-state imaging device 1 has a control unit 101, a pixel array unit 111, a selection unit 112, an A/D conversion unit (analog digital converter (ADC)) 113, and a constant current circuit unit 114.

The control unit 101 controls each unit of the solid-state imaging device 1 to execute processing related to reading of image data (pixel signals), and the like.

The pixel array unit 111 is a pixel region in which pixel configurations having a photoelectric conversion element such as a photodiode are arranged in a matrix (array). The pixel array unit 111 is controlled by the control unit 101 to receive light of the subject at each pixel, photoelectrically convert the incident light to accumulate electric charges, and output the electric charges accumulated at each pixel as a pixel signal at a predetermined timing.

A pixel 121 and a pixel 122 represent two vertically adjacent pixels in a pixel group arranged in the pixel array unit 111. The pixel 121 and the pixel 122 are pixels in consecutive rows in the same column. In the case of the example of FIG. 7, as shown in the pixel 121 and the pixel 122, a circuit of each pixel uses a photoelectric conversion element and four transistors. Note that the circuit of each pixel is formed arbitrarily, and may be different from those of the example shown in FIG. 7.

In a general pixel array, an output line for a pixel signal is provided for each column. In the case of the pixel array unit 111, two (two systems) output lines are provided for each column. The circuits of the pixels of one column are alternately connected to the two output lines. For example, the circuits of the pixels in the odd-numbered rows from the top are connected to one output line, and the circuits of the pixels in the even-numbered rows from the top are connected to the other output line. In the case of the example of FIG. 7, the circuit of the pixel 121 is connected to a first output line (VSL1), and the circuit of the pixel 122 is connected to a second output line (VSL2).

Note that while FIG. 7 shows only output lines for one column for convenience of description, actually, two output lines are similarly provided for every column. A circuit of a pixel of every other row of the column is connected to each output line.

The selection unit 112 has a switch for connecting each output line of the pixel array unit 111 to an input of the ADC 113, and is controlled by the control unit 101 to control the connection between the pixel array unit 111 and the ADC 113. That is, a pixel signal read from the pixel array unit 111 is supplied to the ADC 113 through the selection unit 112.

The selection unit 112 has a switch 131, a switch 132, and a switch 133. The switch 131 (selection SW) controls connection of two output lines from the same column. For example, when the switch 131 is turned on (ON), the first output line (VSL1) and the second output line (VSL2) are connected, and when the switch 131 is turned off (OFF), the first output line (VSL1) and the second output line (VSL2) are disconnected.

Although details will be described later, in the solid-state imaging device 1, one ADC is provided for each output line (column ADC). Accordingly, assuming that both the switch 132 and the switch 133 are turned on, when the switch 131 is turned on, the two output lines of the same column are connected, and therefore the circuit of one pixel is connected to two ADCs. Conversely, when the switch 131 is turned off, the two output lines of the same column are disconnected, and the circuit of one pixel is connected to one ADC. That is, the switch 131 selects the number of ADCs (column ADCs) to which the signals of one pixel is output.

Although details will be described later, since the switch 131 controls the number of ADCs to which the pixel signals are output as described above, the solid-state imaging device 1 can output a wider variety of pixel signals according to the number of ADCs. That is, the solid-state imaging device 1 can achieve more varied data output.

The switch 132 controls connection between the first output line (VSL1) corresponding to the pixel 121 and the ADC corresponding to the output line. When the switch 132 is turned on (ON), the first output line is connected to one input of a comparator of the corresponding ADC. Additionally, when the switch 132 is turned off (OFF), the two are disconnected.

The switch 133 controls connection between the second output line (VSL2) corresponding to the pixel 122 and the ADC corresponding to the output line. When the switch 133 is turned on (ON), the second output line is connected to one input of a comparator of the corresponding ADC. Additionally, when the switch 132 is turned off (OFF), the two are disconnected.

The selection unit 112 can control the number of ADCs (column ADCs) to which the signals of one pixel are output, by switching the states of such switches 131 to 133 under the control of the control unit 101.

Note that the switch 132 and the switch 133 (either one or both) may be omitted, and each output line may be constantly connected to the ADC corresponding to the output line. Note, however, that allowing these switches to control the connection and disconnection widens the selection range of the number of ADCs (column ADCs) to which the signals of one pixel are output. That is, by providing these switches, the solid-state imaging device 1 can output a wider variety of pixel signals.

Note that while FIG. 7 shows only the configuration for the output line for one column, in reality, the selection unit 112 has a configuration similar to that shown in FIG. 7 (switch 131 to switch 133) for each column. That is, the selection unit 112 performs connection control similar to that described above for each column under the control of the control unit 101.

The ADC 113 performs A/D conversion on each of the pixel signals supplied from the pixel array unit 111 through each output line, and outputs the pixel signal as digital data. The ADC 113 has an ADC (column ADC) for each output line from the pixel array unit 111. That is, the ADC 113 has multiple column ADCs. A column ADC corresponding to one output line is a single-slope ADC having a comparator, a D/A converter (DAC), and a counter.

The comparator compares the DAC output with the signal value of the pixel signal. The counter increments the count value (digital value) until the pixel signal and the DAC output become equal. The comparator stops the counter when the DAC output reaches the signal value. Thereafter, the signals digitized by the counters 1 and 2 are output to the outside of the solid-state imaging device 1 from DATA1 and DATA2.

In order to perform the next A/D conversion, after outputting data, the counter resets the count value to an initial value (e.g., 0).

The ADC 113 has two column ADC systems for each column. For example, a comparator 141 (COMP1), a DAC 142 (DAC1), and a counter 143 (counter 1) are provided for the first output line (VSL1), and a comparator 151 (COMP2), a DAC 152 (DAC2), and a counter 153 (counter 2) are provided for the second output line (VSL2). Although not shown, the ADC 113 has similar configurations for output lines of other columns.

Note, however, that among these configurations, the DAC can be shared. DAC sharing is performed for each system. That is, the DAC of the same system in each column is shared. In the case of the example of FIG. 7, the DAC corresponding to the first output line (VSL1) of each column is shared as the DAC 142, and the DAC corresponding to the second output line (VSL2) of each column is shared as the DAC 152. Note that the comparator and the counter are provided for each output line system.

The constant current circuit unit 114 is a constant current circuit connected to each output line, and is driven under the control of the control unit 101. The circuit of the constant current circuit unit 114 includes a metal oxide semiconductor (MOS) transistor or the like, for example. While the circuit is formed arbitrarily, in FIG. 7, for convenience of description, a MOS transistor 161 (LOAD1) is provided for the first output line (VSL1), and a MOS transistor 162 (LOAD2) is provided for the second output line (VSL2).

The control unit 101 receives a request from the outside such as from a user, for example, to select a read mode, controls the selection unit 112, and controls connection to an output line. Additionally, the control unit 101 controls driving of the column ADC according to the selected read mode, for example. Moreover, in addition to the column ADC, when necessary, the control unit 101 controls driving of the constant current circuit unit 114, and controls driving of the pixel array unit 111 such as the reading rate and timing, for example.

That is, the control unit 101 can not only control the selection unit 112, but also operate units other than the selection unit 112 in a wider variety of modes. Accordingly, the solid-state imaging device 1 can output a wider variety of pixel signals.

Note that the number of units shown in FIG. 7 is arbitrary as long as it is not insufficient. For example, three or more output lines may be provided for each column. Additionally, the number of pixel signals output in parallel to the outside may be increased by increasing the number of parallel pixel signals output from the ADC 132 or the number of ADCs 132 themselves shown in FIG. 7.

An example of the functional configuration of the solid-state imaging device according to the embodiment of the present disclosure has been described above with reference to FIG. 7.

<1.3. Circuit Configuration of Unit Pixel>

Figure 8:
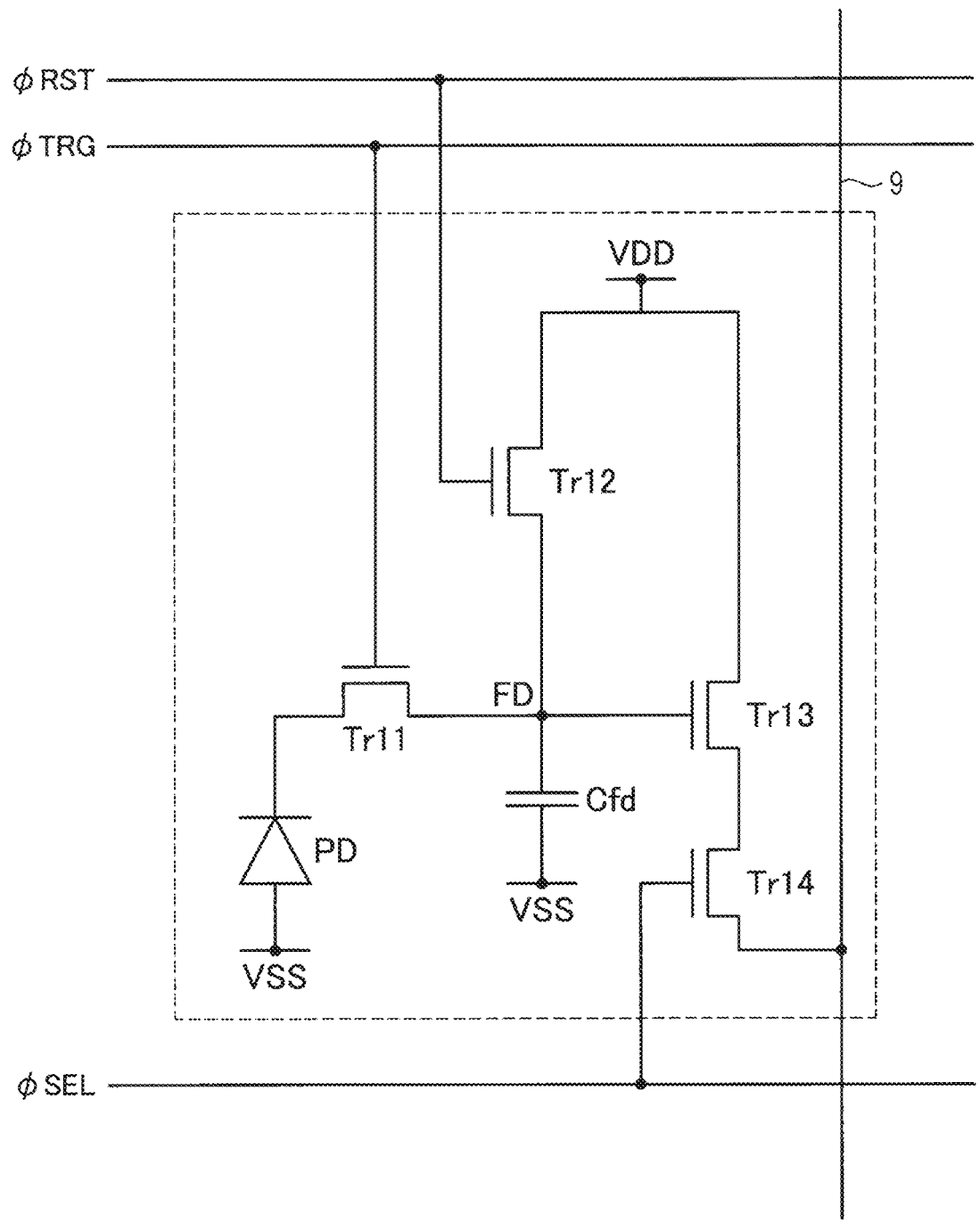
FIG. 8 is a diagram showing an example of a circuit configuration of a unit pixel according to the embodiment of the present disclosure.

Subsequently, an example of a circuit configuration of a unit pixel will be described with reference to FIG. 8. FIG. 8 is a diagram showing an example of a circuit configuration of a unit pixel according to the embodiment of the present disclosure. As shown in FIG. 8, the unit pixel 121 according to the embodiment of the present disclosure includes a photoelectric conversion unit, for example, a photodiode PD, and four pixel transistors. The four pixel transistors are a transfer transistor Tr11, a reset transistor Tr12, an amplification transistor Tr13, and a selection transistor Tr14, for example. The pixel transistors can include n-channel MOS transistors, for example.

The transfer transistor Tr11 is connected between the cathode of the photodiode PD and a floating diffusion part FD. The signal charges (electrons in this description) that have been photoelectrically converted by the photodiode PD and accumulated in the transfer transistor Tr11 are transferred to the floating diffusion part FD when a transfer pulse φTRG is applied to the gate. Note that reference sign Cfd schematically indicates the parasitic capacitance of the floating diffusion part FD.

The reset transistor Tr12 has the drain connected to a power supply VDD and the source connected to the floating diffusion part FD. Then, prior to transfer of the signal charges from the photodiode PD to the floating diffusion part FD, a reset pulse φRST is applied to the gate to reset the potential of the floating diffusion part FD.

The amplification transistor Tr13 has the gate connected to the floating diffusion part FD, the drain connected to the power supply VDD, and the source connected to the drain of the selection transistor Tr14. The amplification transistor Tr13 outputs the potential of the floating diffusion part FD after the resetting by the reset transistor Tr12 as a reset level to the selection transistor Tr14. Moreover, the amplification transistor Tr13 outputs the potential of the floating diffusion part FD after the transfer of the signal charges by the transfer transistor Tr11 as a signal level to the selection transistor Tr14.

The selection transistor Tr14 has the drain connected to the source of the amplification transistor Tr13 and the source connected to the vertical signal line 9, for example. Then, when a selection pulse φSEL is applied to the gate of the selection transistor Tr14, the selection transistor Tr14 is turned on, and the signal output from the amplification transistor Tr13 is output to the vertical signal line 9. Note that the selection transistor Tr14 may be connected between the power supply VDD and the drain of the amplification transistor Tr13.

Note that in a case where the solid-state imaging device 1 according to the present embodiment is configured as a stacked solid-state imaging device, elements such as a photodiode and multiple MOS transistors are formed on the sensor die 23021 in FIG. 2B or 2C, for example. Additionally, the transfer pulse, the reset pulse, the selection pulse, and the power supply voltage are supplied from the logic die 23024 in of FIG. 2B or 2C. Additionally, an element at a stage subsequent to the vertical signal line 9 connected to the drain of the selection transistor an element at a stage subsequent to the vertical signal line 9 connected to the drain of the selection transistor is arranged in the logic circuit 23014, and is formed on the logic die 23024.

An example of the circuit configuration of the unit pixel has been described above with reference to FIG. 8.

2. STUDY ON FAILURE DETECTION

Next, an outline of failure detection in the solid-state imaging device will be described, and then technical problems of the solid-state imaging device according to the embodiment of the present disclosure will be summarized.

In a device such as a vehicle that requires higher reliability for operation, in order to achieve functional safety such as fail-safe, a mechanism for detecting occurrence of a failure when the failure occurs in some units is required in some cases. For example, ISO26262 is a functional safety standard for in-vehicle electronic systems. According to ISO26262, in-vehicle electronic systems, that is, electric/electronic devices and computers (including software) mounted on vehicles are targeted. That is, in a case where the solid-state imaging device is mounted on a vehicle, the solid-state imaging device may also be required to comply with the ISO26262 standard.

The mechanism for achieving the above-mentioned functional safety (hereinafter also referred to as "safety mechanism") needs to be provided according to the function, and as for the signal processing circuit (signal processing unit) for achieving signal processing for pixel signals, it is desired to achieve failure detection at runtime, for example. On the other hand, in signal processing applied to pixel signals, a setting value may be arbitrarily set for the signal processing, such as changes in the setting value of a white balance adjustment gain or a digital gain according to the brightness or the color temperature of a subject, for example. For this reason, even in such a situation, there is a demand for a mechanism that enables detection of abnormality (e.g., failure) in signal processing when the abnormality occurs.

Here, as Comparative Example 1, an example of a technology for detecting a failure of a signal processing circuit in a solid-state imaging device will be described. For example, FIGS. 9 to 11 are explanatory diagrams for describing an outline of the example of the technology for detecting a failure of a signal processing circuit in the solid-state imaging device according to Comparative Example 1.

Figure 9:
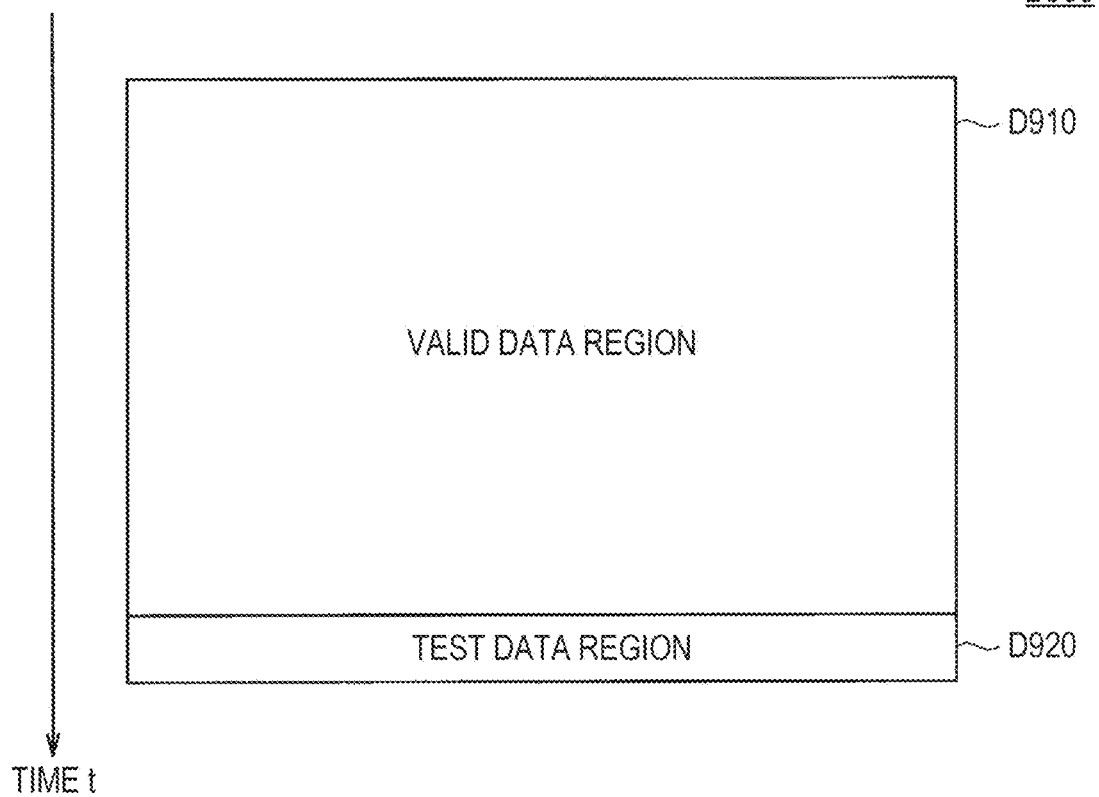
FIG. 9 is an explanatory diagram for describing an outline of an example of a technology for detecting a failure of a signal processing circuit in a solid-state imaging device according to Comparative Example 1.

Specifically, FIG. 9 shows an example of a data structure of frame data generated for each frame in the solid-state imaging device according to Comparative Example 1. As shown in FIG. 9, frame data D900 according to Comparative Example 1 includes a valid data region D910 and a test data region D920. The valid data region D910 is a region with which valid data is associated (e.g., stored). Valid data corresponds to data obtained by performing desired signal processing on a pixel signal corresponding to a light reception result of each pixel (valid pixel). As shown in FIG. 9, the frame data D900 according to Comparative Example 1 is generated such that when the frame data D900 is sequentially read in chronological order, pieces of data associated with the valid data region D910 and the test data region D920 are read in this order. That is, in the frame data D900, the test data region D920 is provided at a stage subsequent to the valid data region D910.

Next, an example of data associated with the test data region D920 (hereinafter also referred to as "test data") and an example of a method of detecting a failure of a signal processing circuit using the test data will be described.

Figure 10:
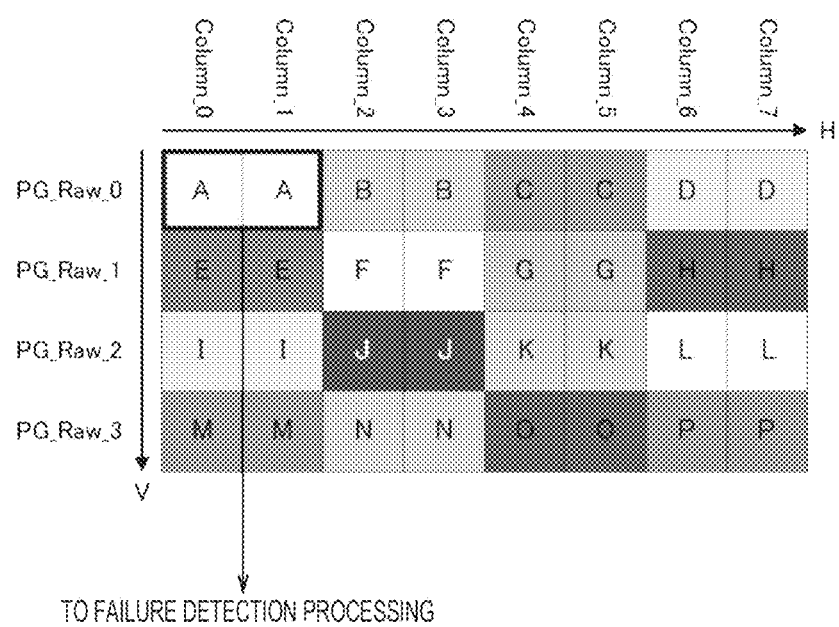
FIG. 10 is an explanatory diagram for describing an outline of an example of a technology for detecting a failure of a signal processing circuit in the solid-state imaging device according to Comparative Example 1.
Figure 11:
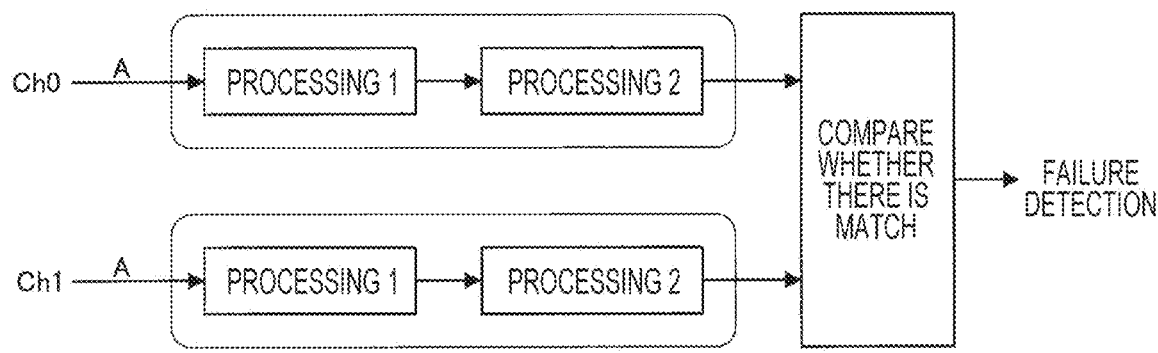
FIG. 11 is an explanatory diagram for describing an outline of an example of a technology for detecting a failure of a signal processing circuit in the solid-state imaging device according to Comparative Example 1.

For example, FIG. 10 is an explanatory diagram for describing an example of test data for detecting a failure of a signal processing circuit in the solid-state imaging device according to Comparative Example 1, and shows an example of test data associated with the test data region D920. In the test data shown in FIG. 10, two pieces of data having the same value are associated with each other as one set, and the test data has one or more sets. For example, in the example shown in FIG. 10, multiple pieces of data are arranged in a matrix, and data of two adjacent columns (i.e., one row and two columns of data) are associated as one set. Additionally, in the example shown in FIG. 10, a series of pieces of test data is generated so that the data value is randomly set for each of the multiple sets. Note that the method for generating test data is not particularly limited. For example, a generation circuit for generating test data (test pattern) as shown in FIG. 10 may be provided separately. Based on such a data configuration, each data is read for each set, and the failure of the signal processing circuit is detected using the data.

For example, FIG. 11 is an explanatory diagram for describing an outline of a mechanism for detecting a failure of a signal processing circuit in the solid-state imaging device according to Comparative Example 1. The solid-state imaging device according to Comparative Example 1 is premised on that the signal processing circuit is multi-phased. For example, in the example shown in FIG. 11, Ch0 and Ch1 are provided as processing blocks for signal processing. Each of the processing blocks Ch0 and Ch1 applies the same signal processing to input data independently of each other. For example, in the example shown in FIG. 11, each of the processing blocks Ch0 and Ch1 applies signal processing indicated as "processing 1" and "processing 2" in this order to input data (in other words, signal) independently of each other. For this reason, in a case where the same data is input to each of the processing blocks Ch0 and Ch1, unless there is abnormality in at least one of the processing blocks Ch0 or Ch1, the output of the processing blocks Ch0 and Ch1 will match.

Using the characteristic described above, in the example shown in FIG. 11, each data is read from the test data shown in FIG. 10 for each set, and the two pieces of data associated as the set are respectively input to the processing blocks Ch0 and Ch1. Then, the pieces of data output from the processing blocks Ch0 and Ch1 (i.e., data after signal processing) are compared, and in a case where the comparison result is an incorrect match, it is determined that there is a failure in at least one of the processing blocks Ch0 or Ch1. With the above-described configuration, even in a case where the setting value of the signal processing performed by each of the processing blocks Ch0 and Ch1 on the input data is arbitrarily changed, for example, it is possible to determine whether or not there is a failure in at least one of the processing blocks Ch0 or Ch1.

On the other hand, the failure detection method described above with reference to FIGS. 9 to 11 is a method that can be applied to a multi-phase signal processing circuit. For this reason, in a single-phase signal processing circuit, even if a failure occurs in the signal processing circuit, it is difficult to determine the presence or absence of the failure.

Figure 12:
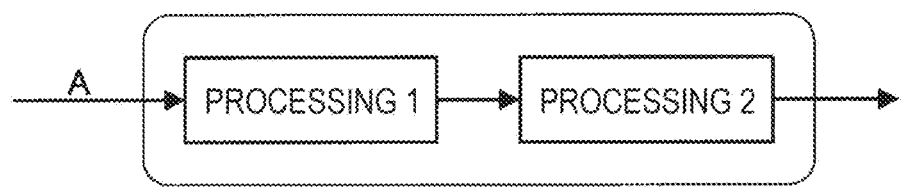
FIG. 12 is an explanatory diagram for describing an example of signal processing by a single-phase signal processing circuit.

For example, FIG. 12 is an explanatory diagram for describing an example of signal processing by a single-phase signal processing circuit. In the example shown in FIG. 12, there is only one processing block for signal processing. Due to such a configuration, in the example shown in FIG. 12, there is no target for determining whether or not the data after the signal processing has a correct result (i.e., whether or not there is failure in processing block). For this reason, if it is assumed that the setting value of the signal processing to be performed on the input data can be changed arbitrarily, it is difficult to determine whether the result of the signal processing is caused by a change in the setting value or a failure in the processing block. Due to such a background, in a case of applying the failure detection method described above with reference to FIGS. 9 to 11 to a signal processing circuit having a low operating frequency and capable of operating in a single phase, for example, the signal processing circuit is required to have a multi-phased configuration for failure detection, which may be a cause of increase in circuit scale and power consumption.

Figure 13:
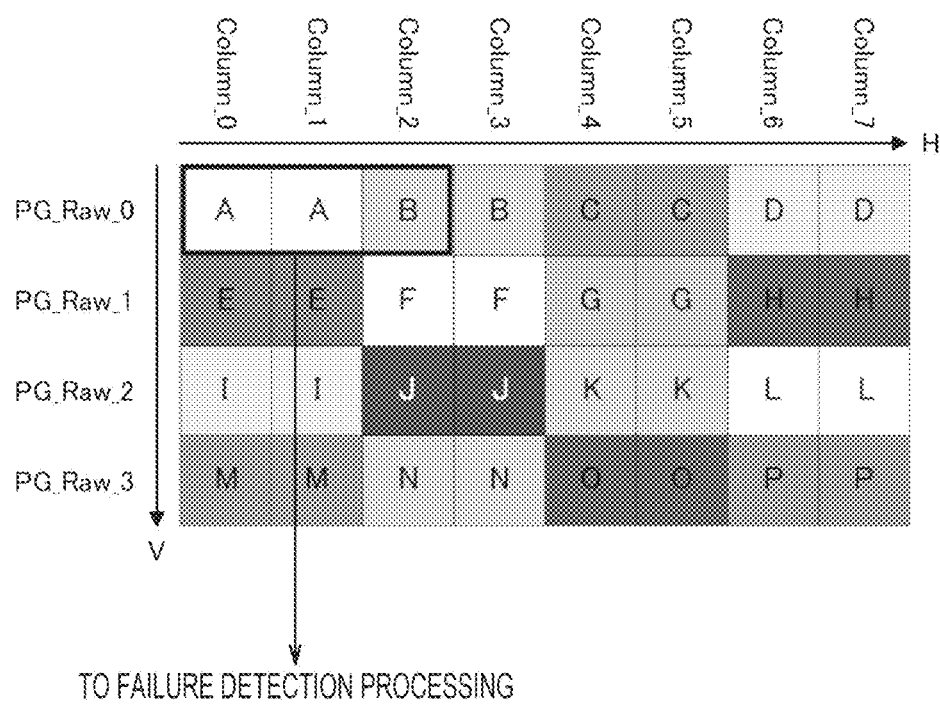
FIG. 13 is an explanatory diagram for describing an example of signal processing by a multilayered signal processing circuit.
Figure 14:
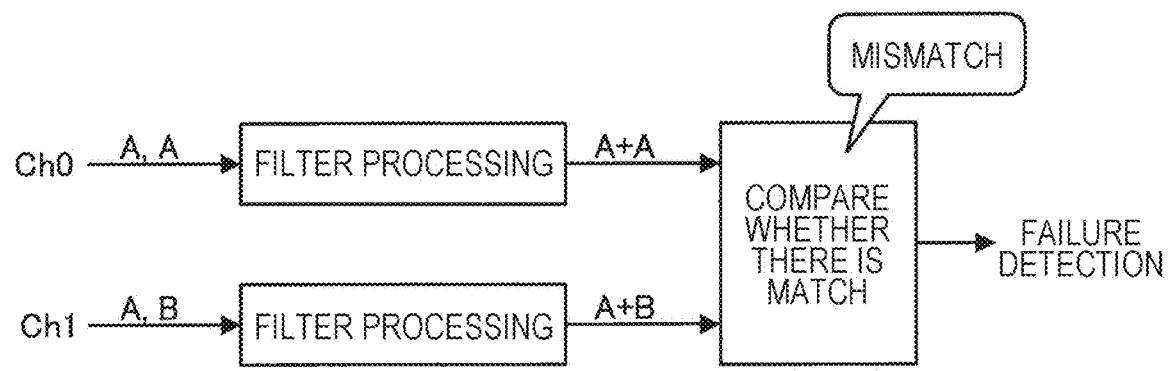
FIG. 14 is an explanatory diagram for describing an example of signal processing by a multilayered signal processing circuit.

Additionally, even in a multilayered signal processing circuit, it can be assumed that the operation of each processing block is not independent. For example, FIGS. 13 and 14 are explanatory diagrams for describing an example of signal processing by a multilayered signal processing circuit, and show an example of a case where the operation of each processing block is not independent. Specifically, FIGS. 13 and 14 show an example of a case where filtering processing is performed with reference to the adjacent pixel.

More specifically, in the example shown in FIGS. 13 and 14, in each signal processing block of the multi-phase signal processing circuit, processing to add two pieces of data adjacent to each other (in other words, data corresponding to two adjacent pixels) is performed. In this case, for example, as shown in FIG. 13, data in the adjacent first and second columns and data in the adjacent second and third columns are read for failure detection, and as shown in FIG. 14, the read pieces of data are input to the processing blocks Ch0 and Ch1, respectively. At this time, as shown in FIG. 13, in a case where each piece of data in the first and second columns is different from the data in the third column, the pieces of data input to the processing blocks Ch0 and Ch1 are different. Hence, the results of the processing blocks Ch0 and Ch1 are different regardless of the presence or absence of failure in the signal processing circuit. That is, as shown in FIGS. 13 and 14, even in a multilayered signal processing circuit, if the operation of each processing block is not independent, it may be difficult to determine the presence or absence of failure in the signal processing circuit with the failure detection method described above as Comparative Example 1.

In view of the above situation, the embodiment of the present disclosure proposes an example of a technology that enables detection of occurrence of abnormality when the abnormality occurs in signal processing applied to pixel signals (i.e., when failure occurs in signal processing circuit of solid-state imaging device). In particular, the present disclosure proposes a technology that can determine the presence or absence of failure in a signal processing circuit, even in a case where a single-phase signal processing circuit is applied as shown in FIG. 12, or a case where the operation of each signal processing block in a multi-phase signal processing circuit is not independent as shown in FIGS. 13 and 14.

3. TECHNICAL FEATURES

Subsequently, technical features of the solid-state imaging device according to the embodiment of the present disclosure will be described below.

<3.1. Functional Configuration>

Figure 15:
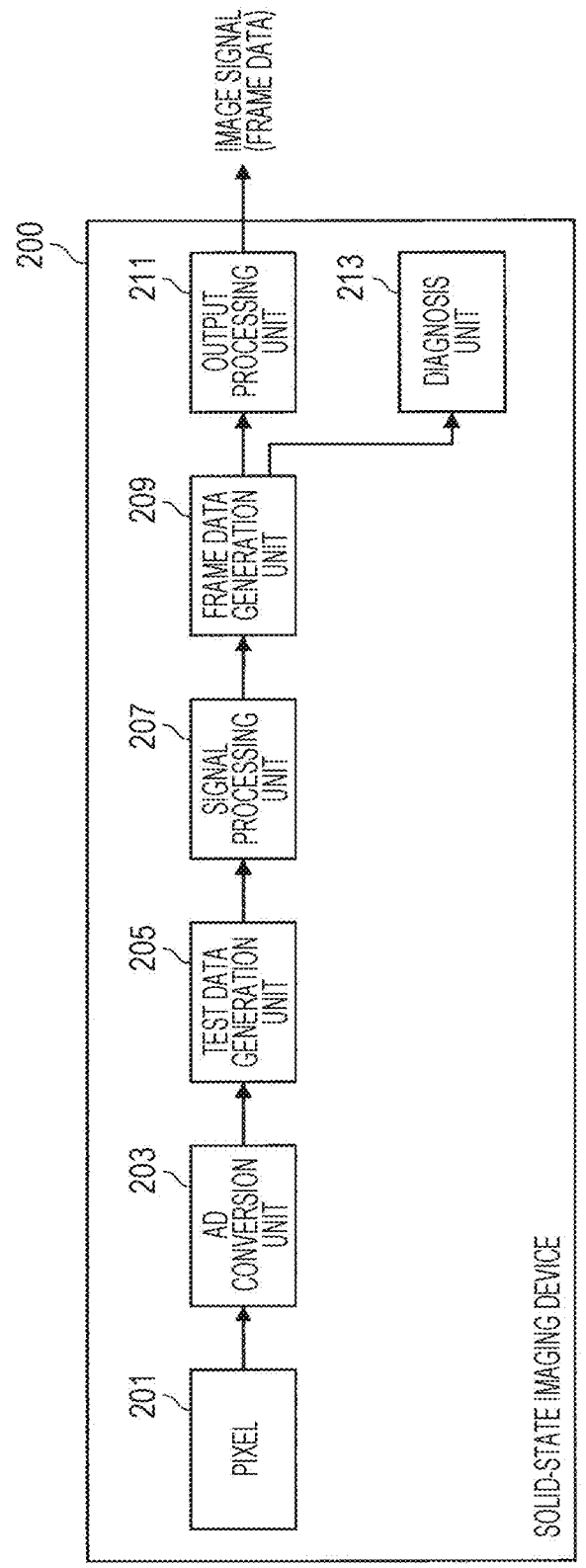
FIG. 15 is a block diagram showing an example of a functional configuration of a solid-state imaging device according to the embodiment of the present disclosure.

First, an example of a functional configuration of the solid-state imaging device according to the embodiment of the present disclosure will be described by focusing particularly on a part that performs signal processing on pixel signals output from each pixel, and a part related to detection of abnormality in the signal processing. For example, FIG. 15 is a block diagram showing an example of a functional configuration of the solid-state imaging device according to the embodiment of the present disclosure, and shows an example of a configuration by focusing on a part where signal processing is performed on a pixel signal. A solid-state imaging device 200 shown in FIG. 15 corresponds to the solid-state imaging device 1 described with reference to FIGS. 1 and 7, for example.

As shown in FIG. 15, the solid-state imaging device 200 includes a pixel 201, an AD conversion unit 203, a test data generation unit 205, a signal processing unit 207, a frame data generation unit 209, and an output processing unit 211. Additionally, the solid-state imaging device 200 may include a diagnosis unit 213.

The pixel 201 corresponds to the pixel 121 or the pixel 122 in the example shown in FIG. 7. Additionally, the AD conversion unit 203 corresponds to the ADC 113 in the example shown in FIG. 7. Note that in the solid-state imaging device 200 shown in FIG. 15 as well, a pixel array can be formed by arranging multiple pixels 201 in a two-dimensional array, similarly to the example shown in FIGS. 1 and 7. However, in FIG. 15, in order to facilitate understanding of the features of the technology related to detection of abnormality in signal processing for a pixel signal, the functional configuration of the solid-state imaging device 200 is schematically illustrated (simplified) by showing multiple pixels as one functional block.

The test data generation unit 205 generates test input data for determining the presence or absence of failure in the signal processing unit 207 described later (i.e., whether or not there is abnormality in signal processing executed by signal processing unit 207). Note that although details will be described later, in the solid-state imaging device 200 according to the present embodiment, the determination regarding the presence or absence of failure in the signal processing unit 207 is made on the basis of test output data generated by performing signal processing on the test input data by the signal processing unit 207. Hence, in the following description, for convenience, test input data generated by the test data generation unit 205 is also simply referred to as "input data", and test output data obtained by performing signal processing on the input data by the signal processing unit 207 is also referred to as "test data". Accordingly, in the following description, when simply referred to as "input data", the test input data described above is indicated unless otherwise specified. Additionally, when simply referred to as "test data", the test output data described above (i.e., input data described above after signal processing) is indicated unless otherwise specified.

The signal processing unit 207 performs various signal processing such as filter processing on the input digital signal (digital data), and outputs the digital signal after the signal processing to the output processing unit 211 located in the subsequent stage. Specifically, for each frame, test input data generated by the test data generation unit 205, and a digital pixel signal obtained by performing AD conversion on an analog pixel signal output for each pixel 201 by the AD conversion unit 203 are input in this order to the signal processing unit 207. The signal processing unit 207 similarly performs various signal processing to be applied to the pixel signal thereafter on the input data. Additionally, the signal processing unit 207 performs the various signal processing described above on the pixel signal (digital signal) of each pixel 201. Note that in the following description, for convenience, data obtained by performing signal processing on the pixel signal (i.e., data for each pixel) by the signal processing unit 207 is also referred to as "valid data".

As the test data described above to be generated for each frame, the signal processing unit 207 generates test data corresponding to the current frame, and test data corresponding to a frame before the current frame (hereinafter also simply referred to as "previous frame", and may be immediately preceding frame, for example). Test data corresponding to the current frame is generated by similarly applying, to the input data, signal processing applied to the pixel signals in the current frame according to the setting corresponding to the frame. Additionally, test data corresponding to the previous frame is generated by similarly applying, to the input data, signal processing applied to the pixel signals in the previous frame according to the setting corresponding to the frame.

Then, the signal processing unit 207 outputs the test data generated for each frame (i.e., test data corresponding to each of current frame and previous frame) and the valid data to the frame data generation unit 209 located in the subsequent stage. Note that the signal processing unit 207 corresponds to an example of a "signal processing unit" that is a target of diagnosis of the presence or absence of failure.

The frame data generation unit 209 associates the test data generated for each frame (i.e., test data corresponding to each of current frame and previous frame) with the valid data, to generate frame data corresponding to the frame. Then, the frame data generation unit 209 outputs the frame data generated for each frame to the output processing unit 211 located in the subsequent stage. Note that the frame data generation unit 209 corresponds to an example of a "data generation unit" that generates frame data.

The output processing unit 211 schematically shows an output interface of the solid-state imaging device 200 for outputting image signals. That is, the output processing unit 211 outputs the frame data generated for each of a series of frames to a predetermined output destination as a series of image signals.

Based on the test data generated for each frame by the signal processing unit 207 (i.e., test data corresponding to each of current frame and previous frame), the diagnosis unit 213 diagnoses whether or not there is abnormality (i.e., presence or absence of failure in signal processing unit 207) in the signal processing performed by the signal processing unit 207.

Note that the solid-state imaging device 200 according to the embodiment of the present disclosure is characterized by the processing related to generation of the test data described above, the configuration of the frame data including the test data, and the diagnosis method (determination method) of the presence or absence of failure in the signal processing unit 207 based on the test data. For this reason, details thereof will be described later as an example of the failure diagnosis according to the embodiment of the present disclosure.

Additionally, the configuration described with reference to FIG. 15 is merely an example, and does not necessarily limit the functional configuration of the solid-state imaging device 200 according to the present embodiment. For example, some of the configurations of the solid-state imaging device 200 shown in FIG. 15 may be provided outside the solid-state imaging device 200. As a specific example, the diagnosis unit 213 may be provided outside the solid-state imaging device 200. Note that in this case, the diagnosis unit 213 may extract the test data from frame data output from the solid-state imaging device 200 for each frame, and make the diagnosis on the basis of the test data. Additionally, the signal processing unit 207 and the frame data generation unit 209 that perform signal processing on the AD-converted digital pixel signals to generate frame data may be provided outside the solid-state imaging device 200. Additionally, in this case, the test data generation unit 205 may also be provided outside the solid-state imaging device 200. Additionally, some of the configurations (e.g., signal processing unit 207, frame data generation unit 209, or the like) may be implemented by multiple electronic devices or multiple devices operating in cooperation with each other. Note that a part corresponding to the signal processing unit 207 and the frame data generation unit 209 (i.e., part that performs signal processing on AD-converted digital pixel signals to generate frame data) corresponds to an example of a "signal processing device".

Additionally, as described above with reference to FIGS. 2A, 2B, and 2C, the solid-state imaging device 200 may be configured as a stacked solid-state imaging device. In this case, a part of the solid-state imaging device 200 corresponding to the signal processing device (e.g., signal processing unit 207 and frame data generation unit 209) may be mounted as a logic circuit (e.g., logic circuit 23014) on another semiconductor substrate (e.g., logic die 23024) different from the semiconductor substrate (e.g., sensor die 23021) on which the pixels 201 are arranged. Note that in this case, the semiconductor substrate on which the pixels 201 are arranged corresponds to an example of a "first semiconductor substrate", and the semiconductor substrate on which the part corresponding to the signal processing device is mounted as a logic circuit corresponds to an example of a "second semiconductor substrate". That is, the second semiconductor substrate is located on the opposite side of the light incident surface of the first semiconductor substrate.

As described above, with reference to FIG. 15, an example of a functional configuration of the solid-state imaging device according to the embodiment of the present disclosure has been described by focusing particularly on a part that performs signal processing on pixel signals output from each pixel, and a part related to detection of abnormality in the signal processing.

<3.2. Details of Failure Diagnosis>

Figure 16:
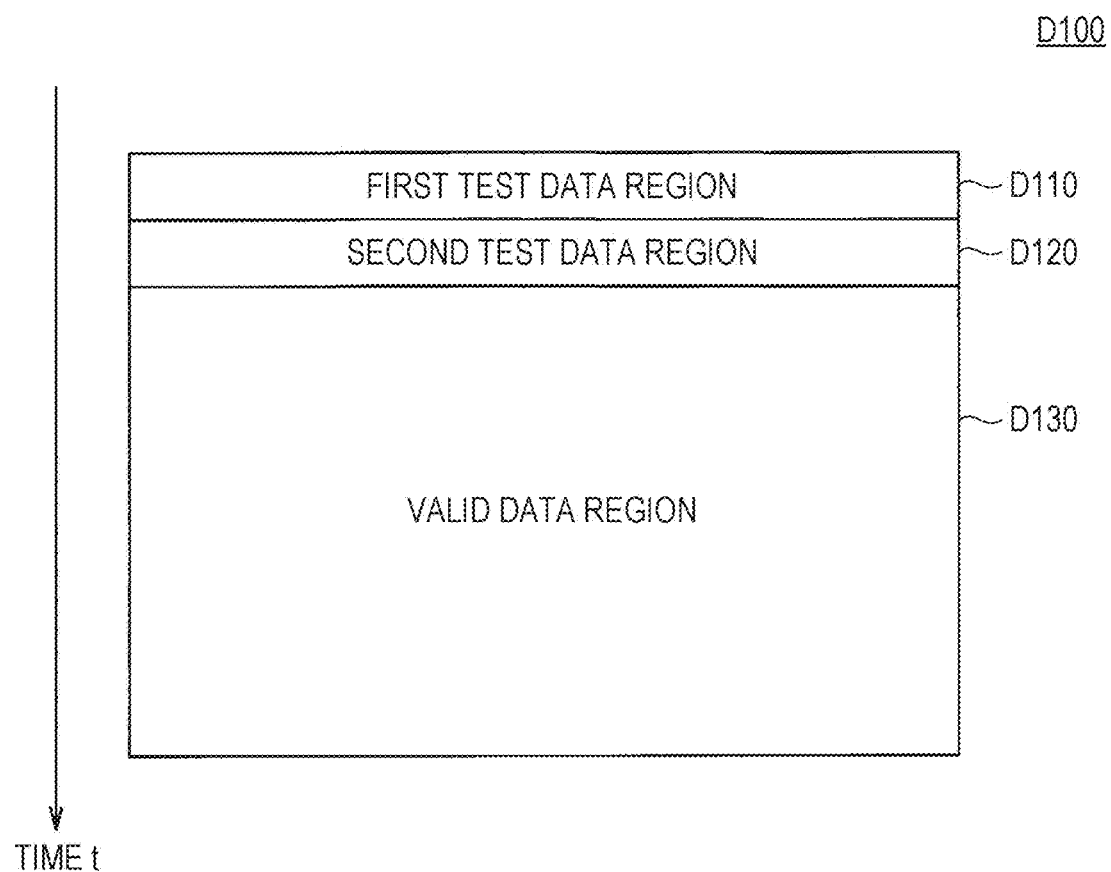
FIG. 16 is a diagram showing an example of a data structure of frame data generated for each frame in the solid-state imaging device according to the same embodiment.

Subsequently, failure diagnosis according to the embodiment of the present disclosure will be described in more detail with reference to FIGS. 16 to 18.

(Frame Data Structure)

First, an example of a data structure of frame data generated for each frame in the solid-state imaging device 200 according to the present embodiment will be described with reference to FIG. 16. FIG. 16 is a diagram showing an example of a data structure of frame data generated for each frame in the solid-state imaging device according to the present embodiment. As shown in FIG. 16, frame data D100 according to the present embodiment includes a first test data region D110, a second test data region D120, and a valid data region D130. The valid data region D130 is a region with which valid data is associated (e.g., stored), and corresponds to the valid data region D910 in the frame data D900 described with reference to FIG. 9.

Each of the first test data region D110 and the second test data region D120 is associated with test data generated by applying image processing to input data in a similar manner as valid data. Specifically, test data generated by performing, on the input data, signal processing according to the setting corresponding to the current frame (i.e., test data corresponding to current frame) is associated with the first test data region D110. Additionally, test data generated by performing, on the input data, signal processing according to the setting corresponding to the previous frame (i.e., test data corresponding to previous frame) is associated with the second test data region D129.

Additionally, the frame data D100 is generated such that when the frame data D100 is sequentially read in chronological order, pieces of data associated with the first test data region D110, the second test data region D120, and the valid data region D130 are read in this order. Note that the first test data region D110, the second test data region D120, and the valid data region D130 correspond to an example of a "first region", a "second region", and a "third region", respectively.

(Processing Flow)

Subsequently, referring to FIG. 17, each of processing related to generation of frame data for each frame, and processing related to a failure diagnosis based on test data associated with the frame data (i.e., diagnosis of presence or absence of failure in signal processing unit 207) will be described. FIG. 17 is a time chart for describing an outline of a failure diagnosis according to the present embodiment, and shows an outline of an example of the flow of a series of processing including processing related to generation of frame data and processing related to the failure diagnosis. In FIG. 17, the horizontal direction corresponds to the time axis. XVS and VLP each indicates a synchronization signal, and processing such as reading pixel signals from each pixel and generating frame data based on the pixel signals is executed in frame units synchronized with these synchronization signals. Note that in FIG. 17, "Frame 1", "Frame 2", and "Frame 3" each indicates the frame described above.

Figure 17:
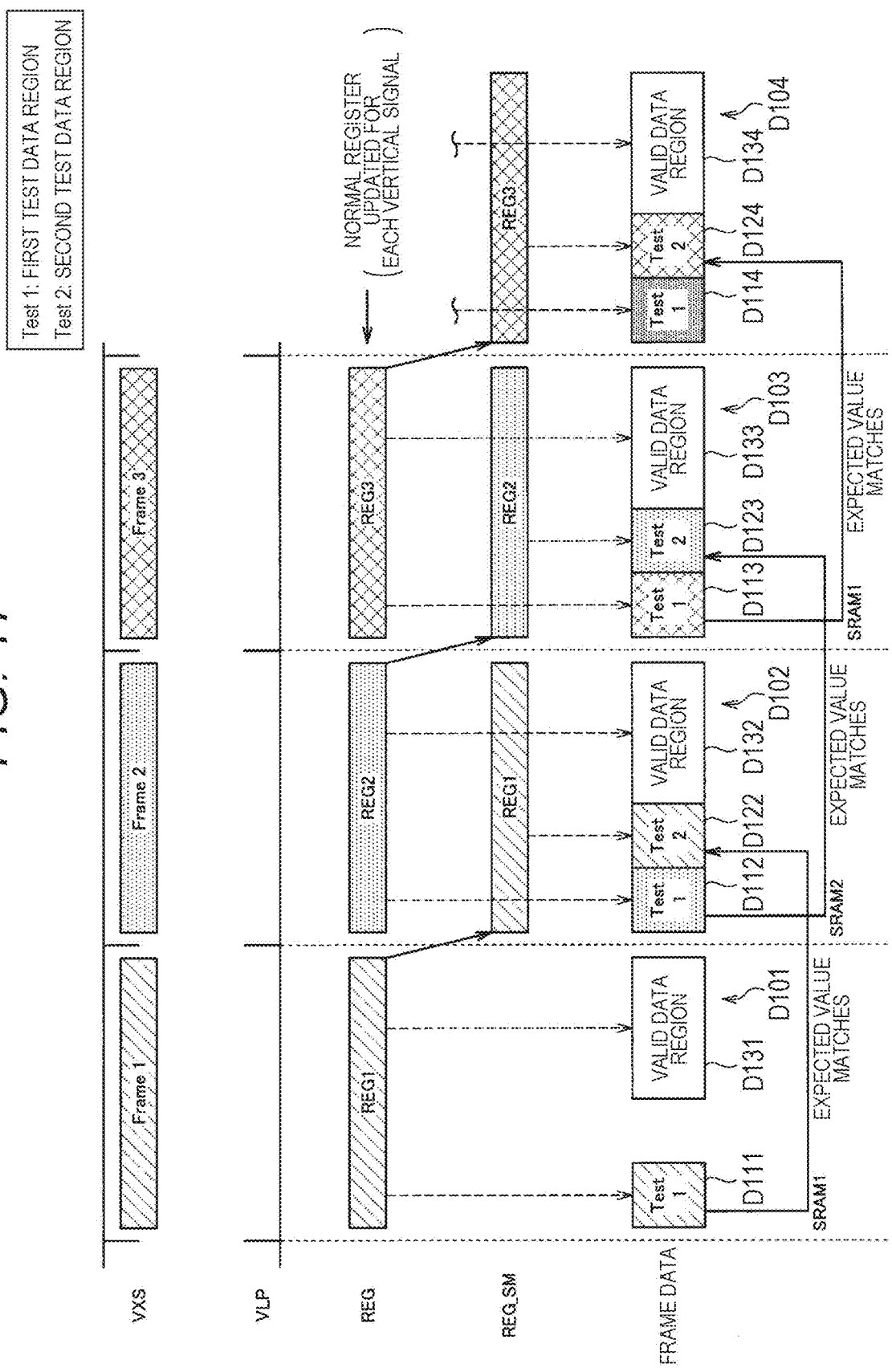
FIG. 17 is a time chart for describing an outline of failure diagnosis according to the same embodiment.

Additionally, in FIG. 17, "REG1", "REG2", and "REG3" schematically indicate a setting value applied to signal processing for pixel signals in "Frame1," "Frame2," and "Frame3," respectively. In the example shown in FIG. 17, two types of setting values are held in different registers and used as setting values applied to signal processing for pixel signals and signal processing for test input data for each frame. Specifically, as the two types of registers, provided are a register REG that holds a setting value (applied value) applied to signal processing for pixel signals in the current frame, and a register REG_SM that holds a setting value (held value) that has been applied to signal processing for pixel signals in the previous frame.

As a specific example, in "Frame2", the register REG holds "REG2" as the setting value (applied value) applied to signal processing for pixel signals in the current frame. Additionally, the register REG_SM holds "REG1" as the setting value (held value) that has been applied to signal processing for pixel signals in "Frame1" which is the frame before "Frame2". Note that in a frame that does not have a previous frame, the register REG_SM need not to hold a setting value (held value).

Based on the above-described configuration, processing related to generation of frame data and processing related to failure detection based on test data associated with the frame data are executed for each frame.

For example, in "Frame1", information regarding "REG1" being the setting value corresponding to "Frame1" is held in the register REG. In addition, processing related to generation of frame data corresponding to "Frame1" is executed.

Specifically, first, signal processing according to the setting value "REG1" held in the register REG is applied to test input data to generate test data D111 corresponding to the current frame. Next, signal processing according to the setting value "REG1" held in the register REG is applied to pixel signals read in "Frame1" to generate valid data D131 corresponding to the current frame. Then, based on the test data D111 and the valid data D131, frame data D101 corresponding to "Frame1" is generated. Specifically, the test data D111 and the valid data D131 are associated with the first test data region and the valid data region of the frame data D101, respectively. That is, when the frame data D101 is sequentially read in chronological order, the test data D111 and the valid data D131 are read in this order.

Additionally, the test data D111 generated in "Frame1" is temporarily held in a predetermined storage region (hereinafter also referred to as "storage region SRAM1"). The test data D111 held in the storage region will be compared with other test data (later-described test data D122) generated under similar conditions in the subsequent "Frame 2". Note that the configuration of the storage region for temporarily holding test data is not particularly limited. That is, a static random access memory (SRAM) may be used, or a register may be used as the storage region.

Subsequently, "Frame 2" will be described. First, the information regarding "REG1" held in the register REG in the previous "Frame1" is held in the register REG_SM. In addition, information regarding "REG2" being the setting value corresponding to "Frame2" is held in the register REG. Then, processing related to generation of frame data corresponding to "Frame2" is executed.

Specifically, first, the signal processing according to the setting value "REG2" held in the register REG is applied to test input data to generate test data D112 corresponding to the current frame. Next, signal processing according to the setting value "REG1" held in the register REG_SM is applied to the input data to generate the test data D122 corresponding to the previous frame. Next, signal processing according to the setting value "REG2" held in the register REG is applied to pixel signals read in "Frame2" to generate valid data D132 corresponding to the current frame. Then, based on the test data D112, the test data D122, and the valid data D132, frame data D102 corresponding to "Frame2" is generated. Specifically, the test data D112, the test data D122, and the valid data D132 are associated with the first test data region, the second test data region, and the valid data region of the frame data D102, respectively. That is, when the frame data D102 is sequentially read in chronological order, the test data D112, the test data D122, and the valid data D132 are read in this order.

Additionally, the test data D112 generated in "Frame2" is temporarily held in another storage region different from the storage region SRAM1 (hereinafter also referred to as "storage region SRAM2").

Next, in "Frame2", based on the test data, which is generated on the basis of the signal processing according to the setting value "REG1" and held in each of the frame data D101 and D102, whether or not there is abnormality in the signal processing (i.e., presence or absence of failure in signal processing unit 207) is diagnosed. Specifically, the test data D111 temporarily stored in the storage region SRAM1 in the previous "Frame1" and the test data D122 generated in the "Frame2" are compared. At this time, if there is no abnormality in the signal processing, the test data D111 and the test data D122 will match as a result of comparison.

On the other hand, if any abnormality occurs in the signal processing in the period from the timing when the test data D111 is generated to the timing when the test data D122 is generated, the test data D111 and the test data D122 will not match as a result of comparison. That is, in this case, it is estimated that abnormality has occurred in the signal processing (in other words, failure has occurred in signal processing unit 207) during this period, that is, at any timing during the period in which the test data D111, the valid data D131, the test data D112, and the test data D122 has been generated.

By using the above characteristics, it is possible to diagnose whether or not abnormality has occurred in the signal processing (in other words, whether or not failure has occurred in signal processing unit 207) in the period from the timing when the test data D111 has been generated to the timing when the test data D122 has been generated.

Note that the method for the above-mentioned comparison for the failure diagnosis is not particularly limited as long as it can be determined whether or not the same data is obtained as the test data D111 and the test data D122. As a specific example, the test data itself may be the comparison target, or a code calculated from each test data (e.g., error correction code such as parity, checksum, or CRC) may be the comparison target.

Additionally, when "Frame1" and "Frame2" are assumed to be "first frame" and "second frame", respectively, the test data D111 and D122 correspond to an example of "first test data", and the test data D112 corresponds to an example of "second test data". That is, "REG1" corresponds to an example of "first setting", and the signal processing based on the "REG1" corresponds to an example of "first processing". Additionally, "REG2" corresponds to an example of "second setting", and the signal processing based on the "REG2" corresponds to an example of "second processing".

Subsequently, "Frame 3" will be described. First, the information regarding "REG2" held in the register REG in the previous "Frame2" is held in the register REG_SM. In addition, information regarding the setting value "REG3" corresponding to "Frame3" is held in the register REG. Then, processing related to generation of frame data corresponding to "Frame3" is executed.

Specifically, first, the signal processing according to the setting value "REG3" held in the register REG is applied to test input data to generate test data D113 corresponding to the current frame. Next, signal processing according to the setting value "REG2" held in the register REG_SM is applied to the input data to generate test data D123 corresponding to the previous frame. Next, signal processing according to the setting value "REG3" held in the register REG is applied to pixel signals read in "Frame3" to generate valid data D133 corresponding to the current frame. Then, based on the test data D113, the test data D123, and the valid data D133, frame data D103 corresponding to "Frame3" is generated. Specifically, the test data D113, the test data D123, and the valid data D133 are associated with the first test data region, the second test data region, and the valid data region of the frame data D103, respectively. That is, when the frame data D103 is sequentially read in chronological order, the test data D113, the test data D123, and the valid data D133 are read in this order.

Additionally, the test data D113 generated in "Frame3" is temporarily stored in the storage region SRAM1.

Next, in "Frame3", based on the test data, which is generated on the basis of the signal processing according to the setting value "REG2" and held in each of the frame data D102 and D103, whether or not there is abnormality in the signal processing (i.e., presence or absence of failure in signal processing unit 207) is diagnosed. Specifically, the test data D112 temporarily stored in the storage region SRAM2 in the previous "Frame2" and the test data D123 generated in the "Frame3" are compared. At this time, if there is no abnormality in the signal processing, the test data D112 and the test data D123 will match as a result of comparison.

On the other hand, if any abnormality occurs in the signal processing in the period from the timing when the test data D112 is generated to the timing when the test data D123 is generated, the test data D112 and the test data D123 will not match as a result of comparison. In this case, it is estimated that abnormality has occurred in the signal processing (in other words, failure has occurred in signal processing unit 207) during this period, that is, at any timing during the period in which the test data D112, the test data D122, the valid data D132, the test data D113, and the test data D123 have been generated.

By using the above characteristics, it is possible to diagnose whether or not abnormality has occurred in the signal processing (in other words, whether or not failure has occurred in signal processing unit 207) in the period from the timing when the test data D112 has been generated to the timing when the test data D123 has been generated.

Note that when "Frame2" and "Frame3" are assumed to be "first frame" and "second frame", respectively, the test data D112 and D123 correspond to an example of "first test data", and the test data D113 corresponds to an example of "second test data". That is, "REG2" corresponds to an example of "first setting", and the signal processing based on the "REG2" corresponds to an example of "first processing". Additionally, "REG3" corresponds to an example of "second setting", and the signal processing based on the "REG3" corresponds to an example of "second processing".

Note that in the subsequent frames as well, similarly to the above, processing related to generation of frame data and processing related to diagnosis of the presence or absence of abnormality in the signal processing based on the test data are sequentially executed. For example, in "Frame4", frame data D104 corresponding to the "Frame4" is generated. Additionally, the frame data D104 is associated with test data D114 corresponding to the current frame, test data D124 corresponding to the previous frame, and valid data D134. Additionally, based on a comparison between the test data D113 temporarily stored in the storage region SRAM1 in the previous "Frame3" and the test data D124 generated in the "Frame4", the presence or absence of abnormality in signal processing is diagnosed. Note that the target of the diagnosis at this time is a period from the timing when the test data D113 is generated to the timing when the test data D124 is generated.

(Failure Diagnosis in First Frame)

Subsequently, with reference to FIG. 18, an example of a method of failure diagnosis in a first frame that does not have a previous frame will be described below. FIG. 18 is a time chart for describing an outline of the failure diagnosis according to the present embodiment, and shows an outline of an example of the flow of a series of processing including processing related to generation of frame data and processing related to the failure diagnosis in the first frame.

As described above, in the failure diagnosis according to the present embodiment, test data is generated in the current frame on the basis of signal processing corresponding to the previous frame, and the test data is compared with other test data generated in the previous frame on the basis of similar signal processing. On the other hand, in the first frame, the previous frame does not exist, and therefore the setting value corresponding to the previous frame (i.e., setting value for signal processing) and other test data generated in the previous frame (i.e., test data to be compared) do not exist. In such a case, a predetermined initial value generated in advance may be used as a value corresponding to the setting value corresponding to the previous frame. Additionally, test data to be compared may be generated in advance on the basis of the initial value and be stored in a predetermined storage region.

Figure 18:
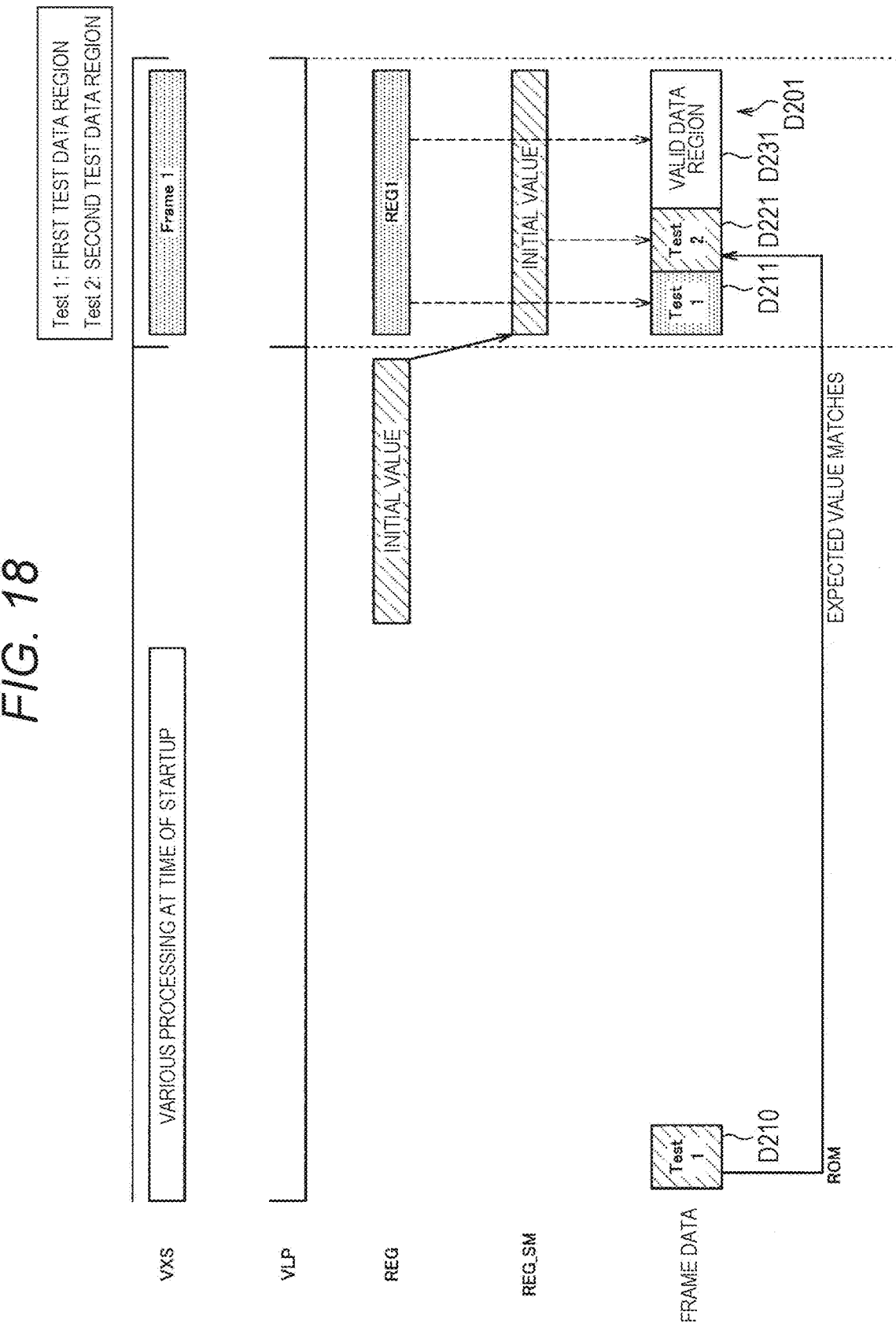
FIG. 18 is a time chart for describing an outline of the failure diagnosis according to the same embodiment.

Specifically, as shown in FIG. 18, when the solid-state imaging device 200 is started and various processing at the time of startup are executed, the "initial value" held in a predetermined storage region is held in the register REG as information corresponding to the setting value corresponding to the previous frame of the first frame.

Next, in the first frame (hereinafter referred to as "Frame1"), the "initial value" held in the register REG is held in the register REG_SM. In addition, information regarding "REG1" being the setting value corresponding to "Frame1" is held in the register REG. Then, processing related to generation of frame data corresponding to "Frame1" is executed.

Specifically, first, the signal processing according to the setting value "REG1" held in the register REG is applied to test input data to generate test data D211 corresponding to the current frame. Next, signal processing according to the "initial value" held in the register REG_SM is applied to the input data to generate test data D221 corresponding to the previous frame. Next, signal processing according to the setting value "REG1" held in the register REG is applied to pixel signals read in "Frame1" to generate valid data D231 corresponding to the current frame. Then, based on the test data D211, the test data D221, and the valid data D231, frame data D201 corresponding to "Frame3" is generated. Specifically, the test data D211, the test data D221, and the valid data D231 are associated with the first test data region, the second test data region, and the valid data region of the frame data D201, respectively. That is, when the frame data D201 is sequentially read in chronological order, the test data D211, the test data D221, and the valid data D231 are read in this order.

Next, the failure diagnosis of the signal processing unit 207 in "Frame 1" will be described. In this case, the test data D221 generated on the basis of the "initial value" in "Frame1" is compared with the test data D210 generated in advance on the basis of the "initial value", so that it is possible to diagnose whether or not a failure has occurred in the signal processing unit 207 (i.e., whether or not abnormality has occurred in signal processing) in the period from after the start of the solid-state imaging device 200 (at least start timing of "Frame1") to the timing when the test data D221 has been generated.

Note that the above-mentioned "initial value" and test data D210 may be stored in advance in a predetermined storage region (e.g., ROM or the like). Additionally, the "initial value" and the test data D210 may be set under conditions that maximize the coverage of failure detection of the signal processing unit 207 (i.e., range to be diagnosed). Note that the conditions that maximize the coverage of failure detection include, for example, a condition in which values that the pixel signal can take are included as many as possible (and thus including all values that the pixel signal can take) as the values forming input data (e.g., value corresponding to pixel signal for each pixel). Additionally, as another example, if the setting of the digital gain or the like remains unchanged, the processing result does not change. Hence, even if a failure occurs, it may be difficult to detect the failure. For this reason, in this case, it is advisable to apply a setting of 1.5 times or 2 times, for example, so that the input and the processing result are different. Additionally, in a case where the application can be switched on and off by turning on and off like a noise reduction function or the like, it is desirable that the function is controlled to ON so that the function (in other words, circuit that carries function) is activated. By performing the settings as described above, even if a failure occurs in the signal processing unit 207 at the time of startup of the solid-state imaging device 200, for example, the failure can be easily detected. Note that the "initial value" described above corresponds to an example of "predetermined setting" applied to signal processing for generating test data when there is no other frame before the current frame.

As described above, in the failure diagnosis according to the present embodiment, for each frame, generation of test data and generation of valid data are sequentially executed and the failure diagnosis of the signal processing unit 207 is made on the basis of the test data. Due to such characteristics, the failure diagnosis according to the present embodiment does not require a multi-phase configuration, and the failure diagnosis can be made even in a single-phase signal processing circuit. That is, the signal processing unit 207 is not required to have a multi-phased configuration for failure diagnosis, and it is possible to curb an increase in circuit scale and power consumption due to the multi-phased configuration. Additionally, in the failure diagnosis according to the present embodiment, the presence or absence of the signal processing is diagnosed on the basis of the comparison between pieces of test data generated according to similar signal processing in different frames. For this reason, as shown in FIG. 17, even when the setting value applied to the signal processing is arbitrarily changed, it is possible to diagnose the presence or absence of abnormality in the signal processing on the basis of the change of the setting value. Additionally, even when filter processing that refers to an adjacent pixel is applied as the signal processing, since a series of test data generated on the basis of the filter processing is compared with each other, it is possible to detect abnormality when the abnormality occurs in the signal processing. Additionally, since the presence or absence of failure is diagnosed depending on whether or not the pieces of test data match as a result of comparison, complicated calculation such as calculation of an expected value for determining whether or not the result of the signal processing is normal is no longer required.

The failure diagnosis according to the embodiment of the present disclosure has been described above in more detail with reference to FIGS. 16 to 18.

<3.3. Modification>

Subsequently, modifications of the solid-state imaging device according to the embodiment of the present disclosure will be described.

(Use of Analog Input Data)

In the above-described example, the test data generation unit 205 that generates test input data is provided at a stage subsequent to the AD conversion unit 203, and the input data is generated as digital data. On the other hand, the test input data may be generated as an analog value. That is, the digital input data in the above-described embodiment may be generated by AD-converting input data generated as an analog value by an AD conversion unit 203. Specifically, a configuration for generating and outputting test input data as an analog value (hereinafter also referred to as "test data generation unit 205'") may be provided in any location between a pixel 201 and the AD conversion unit 203. The test data generation unit 205' corresponds to the test data generation unit 205 in an analog block.

In this case, for example, when abnormality occurs in any of the configurations subsequent to the test data generation unit 205' in the analog block, the analog input data changes, and therefore the test data generation result based on the input data changes before and after the occurrence of the abnormality. As a more specific example, when analog input data is distorted due to occurrence of some abnormality in the propagation path of the analog signal, the test data generation result based on the input data changes before and after the occurrence of the abnormality. Additionally, even when abnormality occurs in the AD conversion unit 203, the test data generation result based on the input data changes before and after the occurrence of the abnormality. For this reason, by using the analog value as the test input data, it is possible to detect the occurrence of abnormality not only at the time of a failure of the signal processing unit 207, but also when some abnormality has occurred in the analog block.

(Failure Detection Outside Solid-State Imaging Device)

In the example described above, the diagnosis unit 213 that detects a failure of the signal processing unit 207 is provided inside the solid-state imaging device 200. On the other hand, as described above, since the test data is associated with the first test data region D110 and the second test data region D120 of the frame data D100, it is also possible to detect a failure of the signal processing unit 207 on the basis of the test data outside the solid-state imaging device 200 (e.g., external server or the like).

(Test Input Data)

The content and generation method of input data that is the generation source of test data are not particularly limited, as long as the input data is generated so as to allow the signal processing unit 207 to be the target of signal processing. As a specific example, the input data may be generated as a fixed value pattern. Additionally, as another example, the input data may be generated on the basis of a random number. Additionally, at this time, a seed value for generating a random number may be set in advance.

The modifications of the solid-state imaging device according to the embodiment of the present disclosure have been described above.

4. HARDWARE CONFIGURATION

Figure 19:
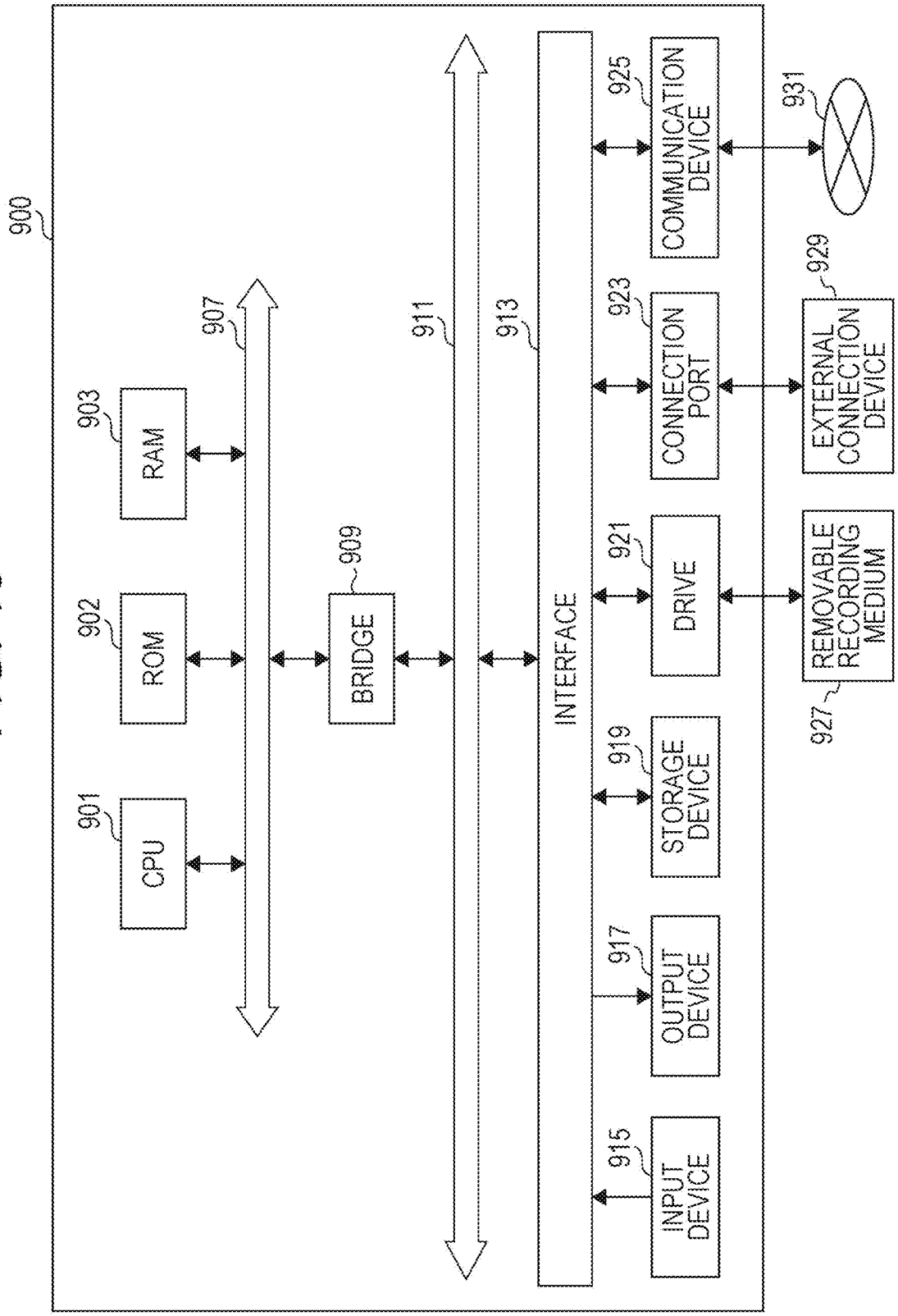
FIG. 19 is a functional block diagram showing an example of a hardware configuration of an information processing device according to the embodiment of the present disclosure.

Next, with reference to FIG. 19, an example of a hardware configuration of an external device (hereinafter also referred to as "information processing device 900") will be described, in a case where a part of the solid-state imaging device 200 described above that corresponds to a signal processing device such as the signal processing unit 207 or the frame data generation unit 209 is configured as the external device. FIG. 19 is a functional block diagram showing an example of a hardware configuration of the information processing device 900 according to the embodiment of the present disclosure.

The information processing device 900 according to the present embodiment mainly includes a CPU 901, a ROM 903, and a RAM 905. Additionally, the information processing device 900 further includes a host bus 907, a bridge 909, an external bus 911, an interface 913, an input device 915, an output device 917, a storage device 919, a drive 921, a connection port 923, and a communication device 925.

The CPU 901 functions as an arithmetic processing device and a control device, and controls the overall operation or a part of the operation in the information processing device 900 according to various programs recorded in the ROM 903, the RAM 905, the storage device 919, or a removable recording medium 927. The ROM 903 stores programs, calculation parameters, and the like used by the CPU 901. The RAM 905 temporarily stores programs used by the CPU 901, and parameters and the like that appropriately change in the execution of the programs. The components are mutually connected by the host bus 907 including an internal bus such as a CPU bus. Note that the test data generation unit 205, the signal processing unit 207, the frame data generation unit 209, and the diagnosis unit 213 described above with reference to FIG. 15 can be implemented by the CPU 901, for example.

The host bus 907 is connected to the external bus 911 such as a peripheral component interconnect/interface (PCI) bus through the bridge 909. Additionally, the input device 915, the output device 917, the storage device 919, the drive 921, the connection port 923, and the communication device 925 are connected to the external bus 911 through the interface 913.

The input device 915 is operation means operated by a user, such as a mouse, a keyboard, a touch panel, a button, a switch, a lever, and a pedal, for example. Additionally, the input device 915 may be remote control means (so-called remote controller) using infrared rays or other radio waves, or may be an external connection device 929 such as a mobile phone or a PDA corresponding to the operation of the information processing device 900, for example. Moreover, the input device 915 may include, for example, an input control circuit or the like that generates an input signal on the basis of information input by a user using the above operation means, and outputs the generated input signal to the CPU 901. The user of the information processing device 900 can input various data to the information processing device 900 and instruct processing operations by operating the input device 915.

The output device 917 includes a device capable of visually or aurally notifying the user of the acquired information. Such devices include display devices such as a CRT display device, a liquid crystal display device, a plasma display device, an EL display device, and a lamp, sound output devices such as a speaker and a headphone, a printer device, and the like. The output device 917 outputs results obtained from various processing performed by the information processing device 900, for example. Specifically, the display device displays the results obtained by various processing performed by the information processing device 900 as text or image. On the other hand, the sound output device converts an audio signal including reproduced speech data, sound data, and the like into an analog signal and outputs the analog signal.

The storage device 919 is a device for data storage formed as an example of a storage unit of the information processing device 900. The storage device 919 includes, for example, a magnetic storage device such as a hard disk drive (HDD), a semiconductor storage device, an optical storage device, a magneto-optical storage device, or the like. The storage device 919 stores programs executed by the CPU 901, various data, and the like.

The drive 921 is a reader/writer for a recording medium, and is built in or externally attached to the information processing device 900. The drive 921 reads information recorded in the removable recording medium 927 such as a mounted magnetic disk, optical disk, magneto-optical disk, or semiconductor memory, and outputs the information to the RAM 905. Additionally, the drive 921 can also write a record on the removable recording medium 927 such as a mounted magnetic disk, optical disk, magneto-optical disk, or semiconductor memory. The removable recording medium 927 is, for example, a DVD medium, an HD-DVD medium, a Blu-ray (registered trademark) medium, or the like. Additionally, the removable recording medium 927 may be a compact flash (registered trademark) (CF), a flash memory, a secure digital (SD) memory card, or the like. Additionally, the removable recording medium 927 may be, for example, an integrated circuit (IC) card equipped with a non-contact type IC chip, an electronic device, or the like.

The connection port 923 is a port for directly connecting to the information processing device 900. Examples of the connection port 923 include a universal serial bus (USB) port, an IEEE1394 port, a small computer system interface (SCSI) port, and the like. Other examples of the connection port 923 include an RS-232C port, an optical audio terminal, a high-definition multimedia interface (HDMI) (registered trademark) port, or the like. By connecting the external connection device 929 to the connection port 923, the information processing device 900 acquires various data directly from the external connection device 929 or provides various data to the external connection device 929.

The communication device 925 is a communication interface including a communication device or the like for connecting to a communication network (network) 931, for example. The communication device 925 is a communication card or the like for wired or wireless local area network (LAN), Bluetooth (registered trademark), or wireless USB (WUSB), for example. Additionally, the communication device 925 may be a router for optical communication, a router for asymmetric digital subscriber line (ADSL), a modem for various communications, or the like. The communication device 925 can transmit and receive signals and the like according to a predetermined protocol such as TCP/IP, for example, with the Internet or another communication device, for example. Additionally, the communication network 931 connected to the communication device 925 includes a network or the like connected by wire or wirelessly, and may be, for example, the Internet, a home LAN, infrared communication, radio wave communication, satellite communication, or the like.

Hereinabove, an example of a hardware configuration capable of implementing the functions of the information processing device 900 according to the embodiment of the present disclosure has been shown. Each of the components described above may be implemented using a general-purpose member, or may be implemented by hardware specialized for the function of each component. Accordingly, it is possible to change the hardware configuration to be used, as appropriate, according to the technical level at each occasion of carrying out the present embodiment. Note that although not shown in FIG. 19, various configurations corresponding to the information processing device 900 according to the present embodiment are naturally provided.

Note that a computer program for implementing each function of the information processing device 900 of the present embodiment as described above can be prepared and implemented on a personal computer or the like. Additionally, a computer readable recording medium in which such a computer program is stored can be also provided. The recording medium is, for example, a magnetic disk, an optical disk, a magneto-optical disk, a flash memory or the like. Additionally, the above computer program may be distributed through a network, for example, without using a recording medium. Additionally, the number of computers that execute the computer program is not particularly limited. For example, the computer program may be executed by multiple computers (e.g., multiple servers and the like) in cooperation with each other. Note that a single computer or a system in which multiple computers cooperate is also referred to as a "computer system".

5. APPLICATION EXAMPLES

Subsequently, application examples of the technology according to the present disclosure will be described. The technology according to the present disclosure can be applied to any device or equipment that has a solid-state imaging device, and is applied in particular, to devices or equipment that require reliability for the operation of the solid-state imaging device. Examples of such devices and equipment that are required to have higher reliability include devices and equipment used in the medical field like medical observation devices such as endoscopes and microscopes. Additionally, as described above, by applying the technology according to the present disclosure to a device such as a vehicle that is required to comply with a functional safety standard such as ISO26262, it is possible to detect occurrence of a failure at runtime when the abnormality occurs in the signal processing circuit of the solid-state imaging device.

Here, an example of applying the technology according to the present disclosure to a movable body will be described below. For example, the technology of the present disclosure may be implemented as a device mounted on any type of movable bodies including a car, an electric car, a hybrid electric car, a motorcycle, a bicycle, a personal mobility, an airplane, a drone, a ship, a robot, and the like.

Figure 20:
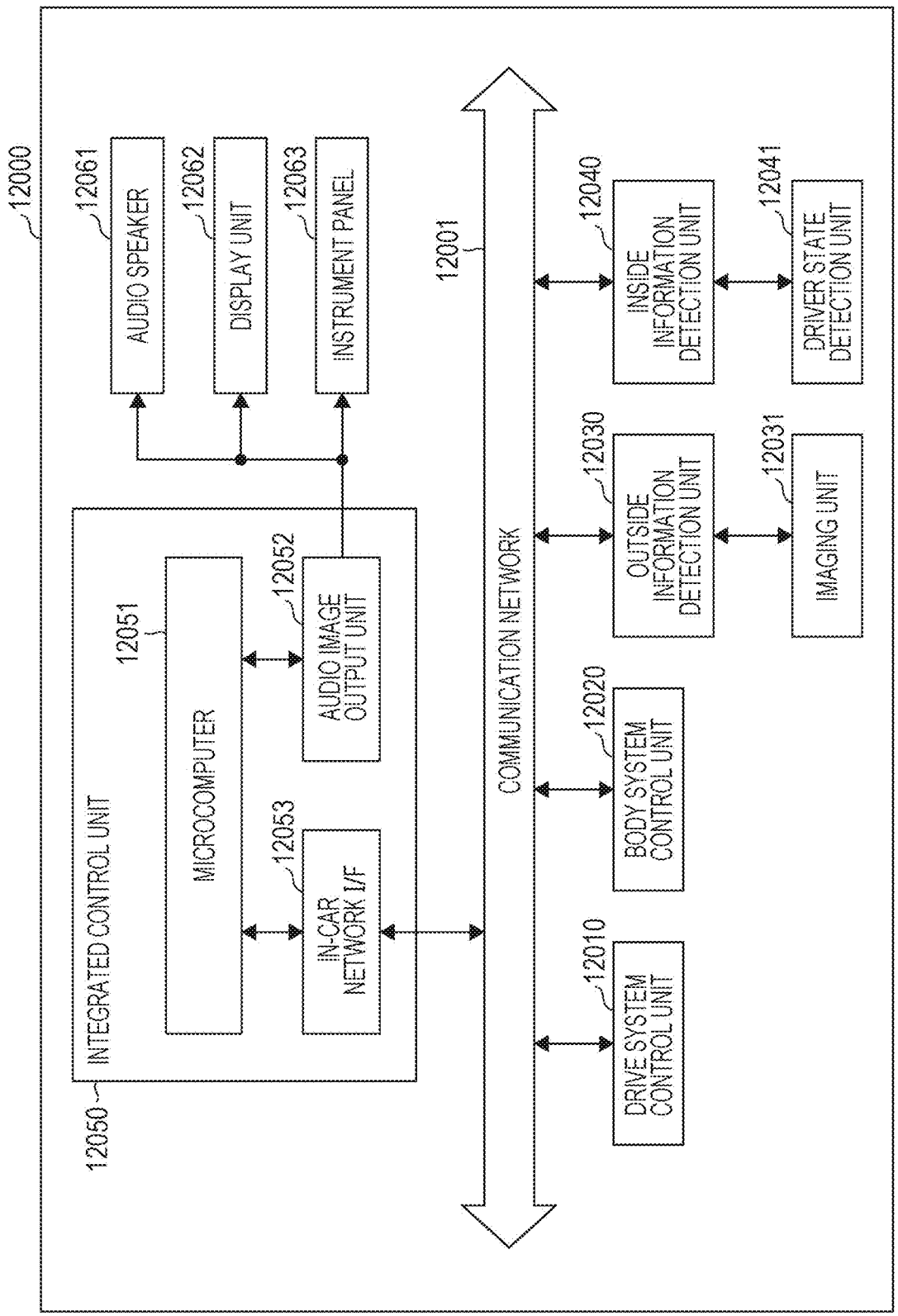
FIG. 20 is a block diagram showing an example of a schematic configuration of a vehicle control system.

FIG. 20 is a block diagram showing a schematic configuration example of a vehicle control system which is an example of a mobile control system to which the technology of the present disclosure can be applied.

A vehicle control system 12000 includes multiple electronic control units connected through a communication network 12001. In the example shown in FIG. 20, the vehicle control system 12000 includes a drive system control unit 12010, a body system control unit 12020, an outside information detection unit 12030, an inside information detection unit 12040, and an integrated control unit 12050. Additionally, as a functional configuration of the integrated control unit 12050, a microcomputer 12051, an audio image output unit 12052, and an in-car network interface (I/F) 12053 are shown.

The drive system control unit 12010 controls the operation of devices related to the drive system of the vehicle according to various programs. For example, the drive system control unit 12010 functions as a controller of a drive force generation device for generating a drive force of a vehicle such as an internal combustion engine or a drive motor, a drive force transmission mechanism for transmitting the drive force to wheels, a steering mechanism that adjusts the steering angle of the vehicle, a braking device that generates a braking force of the vehicle, and the like.

The body system control unit 12020 controls the operation of various devices equipped on the vehicle body according to various programs. For example, the body system control unit 12020 functions as a controller of a keyless entry system, a smart key system, a power window device, or various lamps such as a headlamp, a back lamp, a brake lamp, a blinker, or a fog lamp. In this case, the body system control unit 12020 may receive input of radio waves transmitted from a portable device substituting a key or signals of various switches. The body system control unit 12020 receives input of these radio waves or signals, and controls a door lock device, a power window device, a lamp, and the like of the vehicle.

The outside information detection unit 12030 detects information outside the vehicle equipped with the vehicle control system 12000. For example, an imaging unit 12031 is connected to the outside information detection unit 12030. The outside information detection unit 12030 causes the imaging unit 12031 to capture an image of the outside of the vehicle, and receives the captured image. The outside information detection unit 12030 may perform object detection processing or distance detection processing of a person, a vehicle, an obstacle, a sign, characters on a road surface, or the like on the basis of the received image.

The imaging unit 12031 is an optical sensor that receives light and outputs an electrical signal corresponding to the amount of light received. The imaging unit 12031 can output an electric signal as an image or can output the electrical signal as distance measurement information. Additionally, the light received by the imaging unit 12031 may be visible light or non-visible light such as infrared light.

The inside information detection unit 12040 detects information inside the vehicle. For example, a driver state detection unit 12041 that detects a state of a driver is connected to the inside information detection unit 12040. The driver state detection unit 12041 includes a camera for capturing an image of the driver, for example, and the inside information detection unit 12040 may calculate the degree of fatigue or concentration of the driver or determine whether or not the driver is asleep, on the basis of the detection information input from the driver state detection unit 12041.

The microcomputer 12051 can calculate a control target value of the drive force generation device, the steering mechanism, or the braking device on the basis of the information on the outside or the inside of the vehicle acquired by the outside information detection unit 12030 or the inside information detection unit 12040, and output a control command to the drive system control unit 12010. For example, the microcomputer 12051 can perform coordinated control aimed to achieve functions of an advanced driver assistance system (ADAS) including collision avoidance or shock mitigation of a vehicle, follow-up traveling based on an inter-vehicle distance, vehicle speed maintenance traveling, vehicle collision warning, vehicle lane departure warning, or the like.

Additionally, the microcomputer 12051 can control the drive force generation device, the steering mechanism, the braking device, or the like on the basis of the information around the vehicle acquired by the outside information detection unit 12030 or the inside information detection unit 12040, to perform coordinated control aimed for automatic driving of traveling autonomously without depending on the driver's operation, for example.

Additionally, the microcomputer 12051 can output a control command to the body system control unit 12020 on the basis of the information outside the vehicle acquired by the outside information detection unit 12030. For example, the microcomputer 12051 can control the headlamp according to the position of the preceding vehicle or oncoming vehicle detected by the outside information detection unit 12030, and perform coordinated control aimed for glare prevention such as switching from high beam to low beam.

The audio image output unit 12052 transmits an output signal of at least one of audio or an image to an output device capable of visually or aurally giving notification of information to a passenger or the outside of a vehicle. In the example of FIG. 20, an audio speaker 12061, a display unit 12062, and an instrument panel 12063 are shown as examples of the output device. The display unit 12062 may include at least one of an onboard display or a head-up display, for example.

Figure 21:
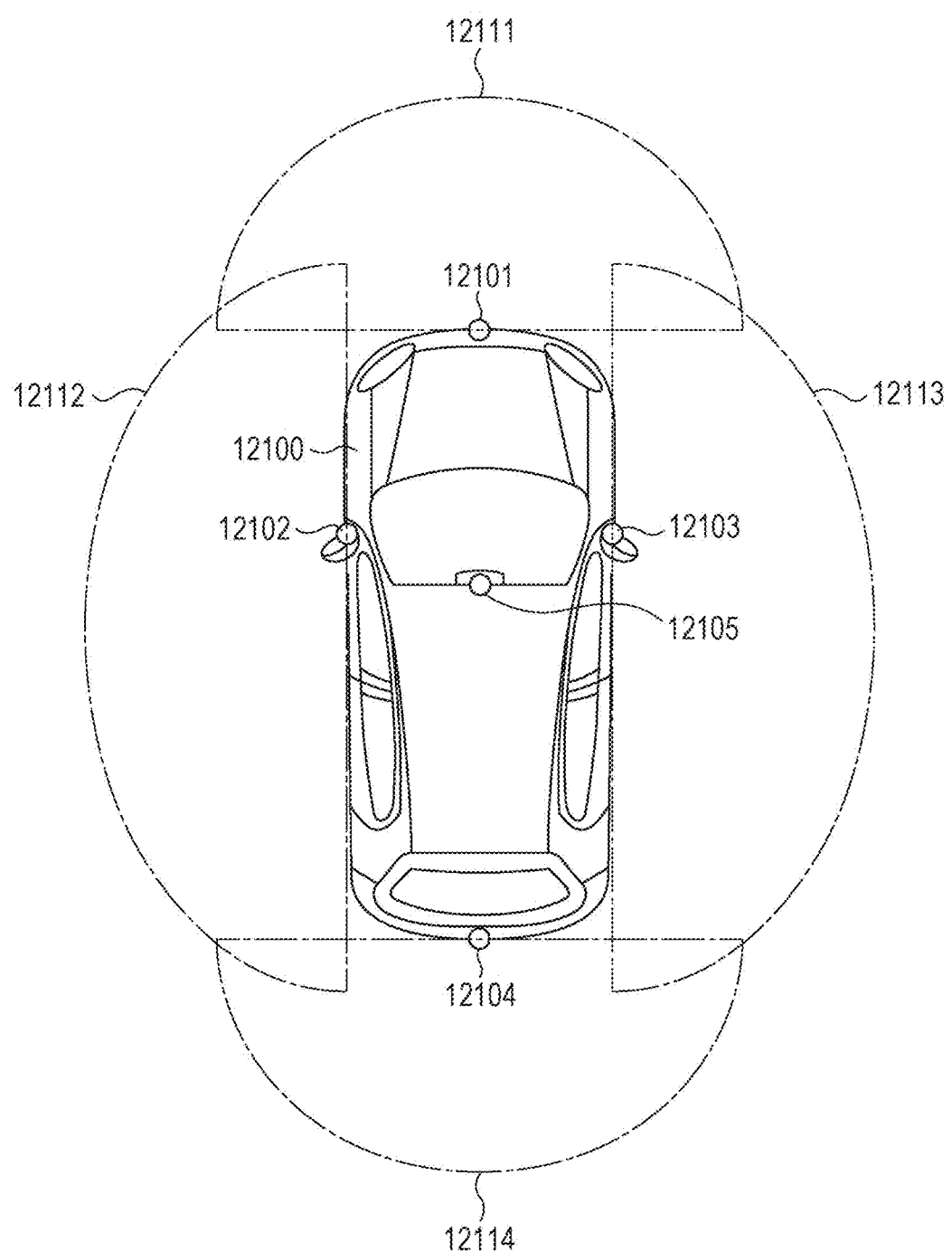
FIG. 21 is an explanatory diagram showing an example of installation positions of an outside information detection unit and an imaging unit.

FIG. 21 is a diagram showing an example of the installation position of the imaging unit 12031.

In FIG. 21, a vehicle 12100 includes imaging units 12101, 12102, 12103, 12104, and 12105 as the imaging unit 12031.

For example, the imaging units 12101, 12102, 12103, 12104, and 12105 are provided in positions such as a front nose, a side mirror, a rear bumper, a back door, and an upper portion of a windshield in the vehicle interior of the vehicle 12100. The imaging unit 12101 provided on the front nose and the imaging unit 12105 provided on the upper portion of the windshield in the vehicle interior mainly acquire images of the front of the vehicle 12100. The imaging units 12102 and 12103 provided on the side mirrors mainly acquire images of the sides of the vehicle 12100. The imaging unit 12104 provided in the rear bumper or the back door mainly acquires an image of the rear of the vehicle 12100. Images of the front acquired by the imaging units 12101 and 12105 are mainly used to detect a preceding vehicle or a pedestrian, an obstacle, a traffic light, a traffic sign, a lane, or the like.

Note that FIG. 21 shows an example of the imaging ranges of the imaging units 12101 to 12104. An imaging range 12111 indicates the imaging range of the imaging unit 12101 provided in the front nose, imaging ranges 12112 and 12113 indicate the imaging ranges of the imaging units 12102 and 12103 provided on the side mirrors, respectively, and an imaging range 12114 indicates the imaging range of the imaging unit 12104 provided in the rear bumper or the back door. For example, by superimposing the pieces of image data captured by the imaging units 12101 to 12104, a bird's eye view image of the vehicle 12100 as viewed from above can be obtained.

At least one of the imaging units 12101 to 12104 may have a function of acquiring distance information. For example, at least one of the imaging units 12101 to 12104 may be a stereo camera including multiple imaging devices, or may be an imaging device having pixels for phase difference detection.

For example, the microcomputer 12051 can measure the distance to each three-dimensional object in the imaging ranges 12111 to 12114 and the temporal change of this distance (relative velocity with respect to vehicle 12100) on the basis of the distance information obtained from the imaging units 12101 to 12104, to extract, as a preceding vehicle, the closest three-dimensional object on the traveling path of the vehicle 12100 in particular, the three-dimensional object traveling at a predetermined speed (e.g., 0 km/h or more) in substantially the same direction as the vehicle 12100. Moreover, the microcomputer 12051 can set an inter-vehicle distance to be secured in advance before the preceding vehicle, and perform automatic brake control (including follow-up stop control), automatic acceleration control (including follow-up start control), and the like. As described above, it is possible to perform coordinated control aimed for automatic driving of traveling autonomously without depending on the driver's operation, for example.

For example, on the basis of the distance information obtained from the imaging units 12101 to 12104, the microcomputer 12051 can extract three-dimensional object data regarding three-dimensional objects by classifying the data into a two-wheeled vehicle, an ordinary vehicle, a large vehicle, a pedestrian, and other three-dimensional objects such as a telephone pole, and use the data for automatic avoidance of obstacles. For example, the microcomputer 12051 identifies obstacles around the vehicle 12100 into obstacles visible and obstacles hardly visible to the driver of the vehicle 12100. Then, the microcomputer 12051 can determine the collision risk indicating the degree of risk of collision with each obstacle, and when the collision risk is a setting value or more and there is a possibility of a collision, the microcomputer 12051 can perform driving support for collision avoidance by outputting a warning to the driver through the audio speaker 12061 or the display unit 12062, or by performing forcible deceleration or avoidance steering through the drive system control unit 12010.

At least one of the imaging units 12101 to 12104 may be an infrared camera that detects infrared light. For example, the microcomputer 12051 can recognize a pedestrian by determining whether or not a pedestrian is present in the images captured by the imaging units 12101 to 12104. Such pedestrian recognition is performed by a procedure of extracting feature points in images captured by the imaging units 12101 to 12104 as infrared cameras, and a procedure of performing pattern matching processing on a series of feature points indicating the outline of an object to determine whether or not the object is a pedestrian, for example. When the microcomputer 12051 determines that a pedestrian is present in the images captured by the imaging units 12101 to 12104 and recognizes the pedestrian, the audio image output unit 12052 controls the display unit 12062, so that a square outline for emphasis is superimposed on the recognized pedestrian. Additionally, the audio image output unit 12052 may control the display unit 12062, so that an icon or the like indicating a pedestrian is displayed in a desired position.

Hereinabove, an example of the vehicle control system to which the technology of the present disclosure can be applied has been described. The technology according to the present disclosure is applicable to the imaging unit 12031 among the configurations described above. Specifically, the solid-state imaging device 1 shown in FIG. 1 can be applied to the imaging unit 12031. By applying the technology according to the present disclosure to the imaging unit 12031, it is possible to encrypt various information acquired by the imaging unit 12031 (e.g., image information obtained as imaging result, or the like) inside the imaging unit 12031, on the basis of information unique to the device (solid-state imaging device), for example. As a result, it is possible to further improve the security regarding protection of the information acquired by the imaging unit 12031, for example. Moreover, by applying the technology according to the present disclosure to the imaging unit 12031, it is possible to diagnose the presence or absence of failure in the signal processing circuit of the imaging unit 12031, and detect whether or not the signal processing circuit is normal. Then, if the signal processing circuits are abnormal, by notifying the microcomputer 12051 of the detection result, the outside information detection unit 12030 in the vehicle control system 12000 can grasp that a malfunction has occurred in the imaging unit 12031, for example. With this configuration, in the vehicle control system 12000, it is possible to perform appropriate processing such as calling the driver's attention, for example, and thus it is possible to improve reliability. Additionally, the vehicle control system 12000 can limit the function of controlling the vehicle on the basis of the detection result. Specific examples of the function of controlling the vehicle include a collision avoidance or collision mitigation function of the vehicle, a follow-up traveling function based on an inter-vehicle distance, a vehicle speed maintaining traveling function, a vehicle collision warning function, a vehicle lane departure warning function, and the like. When it is determined that the signal processing circuit in the imaging unit 12031 is abnormal, the function of controlling the vehicle can be limited or prohibited. Specifically, the outside information detection unit 12030 can control the brake, the engine output, the motor output, and the transmission. As a result, in the vehicle control system 12000, it is possible to prevent an accident caused by erroneous detection based on abnormality in the signal processing circuit in the imaging unit 12031.

6. CONCLUSION

As described above, in the solid-state imaging device according to the present embodiment, the part corresponding to the signal processing device includes the signal processing unit that performs signal processing on pixel signals, and the frame data generation unit that generates frame data on the basis of valid data obtained by performing signal processing on the pixel signals. Specifically, the frame data generation unit associates first test data, second test data, and valid data based on pixel signals read in the second frame after the first frame to generate frame data corresponding to the second frame. At this time, the first test data is generated by performing first processing on test input data. The first processing is the signal processing for generating valid data in the first frame. Additionally, the second test data is generated by performing second processing on the input data. The second processing is the signal processing for generating valid data in the second frame after the first frame. With all of the above-mentioned configuration, the presence or absence of abnormality in the signal processing is diagnosed on the basis of the first test data associated with the frame data corresponding to the first frame, and the first test data associated with the frame data corresponding to the second frame, With the configuration as described above, for each frame, the signal processing device sequentially executes generation of test data and generation of valid data, and can then diagnose the presence or absence of abnormality in the signal processing (i.e., presence or absence of failure in signal processing circuit) on the basis of the test data. Due to such characteristics, even in a case of a single-phase signal processing circuit, for example, the signal processing device can diagnose the presence or absence of failure in the signal processing circuit. In other words, the signal processing circuit is not required to have a multi-phase configuration for failure diagnosis, and it is possible to curb an increase in circuit scale and power consumption due to the multi-phase configuration. Additionally, as described above, the presence or absence of the signal processing is diagnosed on the basis of the comparison between pieces of test data generated according to similar signal processing in different frames. For this reason, for example, even when the setting value applied to the signal processing is arbitrarily changed, it is possible to diagnose the presence or absence of abnormality in the signal processing on the basis of the change of the setting value. Additionally, even when filter processing that refers to an adjacent pixel is applied as the signal processing, since a series of test data generated on the basis of the filter processing is compared with each other, it is possible to detect abnormality when the abnormality occurs in the signal processing. Additionally, since the presence or absence of failure is diagnosed depending on whether or not the pieces of test data match as a result of comparison, complicated calculation such as calculation of an expected value for determining whether or not the result of the signal processing is normal is no longer required. As described above, according to the signal processing device, it is possible to detect the occurrence of abnormality in a more preferable manner when the abnormality occurs in signal processing applied to pixel signals.

Hereinabove, the preferred embodiments of the present disclosure have been described in detail with reference to the accompanying drawings. However, the technical scope of the present disclosure is not limited to such examples. It will be apparent to those skilled in the art of the present disclosure that various changes or modifications can be conceived within the scope of the technical idea described in the claims. It is understood that these also belong to the technical scope of the present disclosure, as a matter of course.

For example, although pieces of test data are compared between consecutive frames in the above example, the invention is not necessarily limited to this. For example, test data generated in a two or more previous frame and held in the predetermined storage region may be compared with test data generated in the current frame. Additionally, although the above description has been mainly focused on processing targeting an image signal, application of the technology according to the present disclosure is not necessarily limited to signal processing targeting an image signal. That is, the technology according to the present disclosure can be applied as long as the signal processing is performed on input signals at a constant cycle. As a specific example, by applying the technology according to the present disclosure to signal processing targeting an acoustic signal such as voice, music, and sound effect, it is possible to diagnose whether or not abnormality has occurred in the signal processing.

Additionally, the effects described in the present specification are merely illustrative or exemplary, and are not limiting. That is, the technology according to the present disclosure can exhibit other effects apparent to those skilled in the art from the description of the present specification, in addition to or instead of the effects described above.

Note that the following configurations are also within the technical scope of the present disclosure.

(1)

A signal processing device including:

a signal processing unit that performs signal processing on pixel signals; and a data generation unit that associates first test data obtained by performing first processing on input data, second test data obtained by performing second processing on the input data, and valid data obtained by performing the second processing on the pixel signals read in a second frame after a first frame to generate frame data corresponding to the second frame, in which the first processing is the signal processing for generating the valid data in the first frame, the second processing is the signal processing for generating the valid data in the second frame, and presence or absence of abnormality in the signal processing is diagnosed on the basis of the first test data associated with the frame data corresponding to the first frame, and the first test data associated with the frame data corresponding to the second frame.

(2)

The signal processing device according to (1) above, in which the frame data includes a first region, a second region, and a third region that are sequentially read in chronological order, and in the frame data corresponding to the second frame, the second test data generated in the second frame, the first test data, and the valid data corresponding to the second frame are associated, in this order, with the first region, the second region, and the third region.

(3)

The signal processing device according to (2) above, in which in the second frame, the second test data, the first test data, and the valid data are generated chronologically in this order.

(4)

The signal processing device according to (2) or (3) above, in which in the second frame, presence or absence of abnormality in the signal processing is diagnosed on the basis of the first test data stored in the first region of the frame data corresponding to the first frame, and the first test data stored in the second region of the frame data corresponding to the second frame.

(5)

The signal processing device according to (4) above, in which in the second frame, presence or absence of abnormality in the signal processing is diagnosed in a period from a timing when the first test data associated with the frame data corresponding to the first frame has been generated to a timing when the first test data associated to the frame data corresponding to the second frame has been generated.

(6)

The signal processing device according to (4) or (5) above, in which the frame data corresponding to each of the first frame and the second frame are read chronologically in this order, and the diagnosis is made in the second frame.

(7)

The signal processing device according to any one of (1) to (6) above, in which the first processing is the signal processing for generating the valid data in the first frame on the basis of a first setting corresponding to the first frame, and the second processing is the signal processing for generating the valid data in the second frame on the basis of a second setting corresponding to the second frame.

(8)

The signal processing device according to any one of (1) to (7) above, in which the diagnosis in the second frame is made by comparing the first test data associated with the frame data corresponding to the first frame and the first test data associated with the frame data corresponding to the second frame.

(9)

The signal processing device according to any one of (1) to (7) above, in which the diagnosis in the second frame is made by comparing a code based on the first test data associated with the frame data corresponding to the first frame and a code based on the first test data associated with the frame data corresponding to the second frame.

(10)

The signal processing device according to (9) above, in which the code to be compared is an error correction code.

(11)

The signal processing device according to any one of (1) to (10) above, in which the input data is generated on the basis of a random number.

(12)

The signal processing device according to any one of (1) to (10) above, in which the input data is generated by converting an analog value into digital data.

(13)

The signal processing device according to (12) above, in which the analog value is output from between a pixel that outputs the pixel signal as an analog signal and an AD conversion unit that converts the analog signal into a digital signal.

(14)

The signal processing device according to any one of (1) to (13) above, in which in a case where there is no other frame before a current frame, the data generation unit generates the frame data corresponding to the current frame on the basis of test data obtained by performing the signal processing based on a predetermined setting on the input data, and the diagnosis in the current frame is made on the basis of the test data generated in the current frame and other test data generated in advance.

(15)

The signal processing device according to (14) above, in which the other test data is generated by performing the signal processing based on the predetermined setting on the input data.

(16)

The signal processing device according to (14) or (15) above, in which the predetermined setting is set so as to maximize a range targeted for the diagnosis based on the test data generated.

(17)

The signal processing device according to any one of (1) to (16) above, further including a diagnosis unit that makes the diagnosis.

(18)

The signal processing device according to any one of (1) to (16) above, in which the diagnosis is made by another device.

(19)

The signal processing device according to any one of (1) to (18) above, in which in a stacked imaging device in which a first semiconductor substrate on which pixels that output the pixel signals arranged and a second semiconductor substrate different from the first semiconductor substrate are stacked, the signal processing device is arranged on the second semiconductor substrate.

(20)

The signal processing device according to (19) above, in which the second semiconductor substrate is located on an opposite side of a light incident surface of the first semiconductor substrate on which the pixels are arranged.

(21)

A signal processing method including:

by a computer performing signal processing on pixel signals, and associating first test data obtained by performing first processing on input data, second test data obtained by performing second processing on the input data, and valid data obtained by performing the second processing on the pixel signals read in a second frame after a first frame to generate frame data corresponding to the second frame, in which the first processing is the signal processing for generating the valid data in the first frame, the second processing is the signal processing for generating the valid data in the second frame, and presence or absence of abnormality in the signal processing is diagnosed on the basis of the first test data associated with the frame data corresponding to the first frame, and the first test data associated with the frame data corresponding to the second frame.

(22)

A signal processing system including:

a signal processing unit that performs signal processing on pixel signals;

a data generation unit that associates first test data obtained by performing first processing on input data, second test data obtained by performing second processing on the input data, and valid data obtained by performing the second processing on the pixel signals read in a second frame after a first frame to generate frame data corresponding to the second frame; and a diagnosis unit that diagnoses presence or absence of abnormality in the signal processing on the basis of the first test data associated with the frame data corresponding to the first frame, and the first test data associated with the frame data corresponding to the second frame, in which the first processing is the signal processing for generating the valid data in the first frame, and the second processing is the signal processing for generating the valid data in the second frame.

REFERENCE SIGNS LIST

200 Solid-state imaging device
201 Pixel
203 Conversion unit
205 Test data generation unit
207 Signal processing unit
209 Frame data generation unit
211 Output processing unit
213 Diagnosis unit

The invention claimed is:

1. A signal processing device, comprising:
   a signal processing unit configured to:
      receive pixel signals and input data, wherein the pixel signals and the input data correspond to a plurality of frames of an image;
      execute signal processing on the pixel signals;
      execute first processing on the input data to generate first test data, wherein the first test data is associated with first frame data corresponding to a first frame of the plurality of frames;
      execute second processing on the input data to generate second test data; and
      execute the second processing on the pixel signals read in a second frame of the plurality of frames, to generate valid data, wherein the second frame is subsequent to the first frame; and
   a data generation unit configured to associate the first test data and the second test data with the valid data to generate second frame data corresponding to the second frame, wherein
      the first processing is the signal processing to generate the valid data in the first frame,
      the second processing is the signal processing to generate the valid data in the second frame, and
      diagnosis of presence or absence of abnormality in the signal processing is based on the first test data associated with the first frame data corresponding to the first frame, and the first test data associated with the second frame data corresponding to the second frame.

2. The signal processing device according to claim 1, wherein
   each of the first frame data and the second frame data includes a first region, a second region, and a third region that are sequentially read in chronological order, and
   in the second frame data corresponding to the second frame, the second test data generated in the second frame, the first test data, and the valid data corresponding to the second frame are associated, in this order, with the first region, the second region, and the third region.

3. The signal processing device according to claim 2, wherein the signal processing unit is further configured to generate, for the second frame, the second test data, the first test data, and the valid data chronologically in this order.

4. The signal processing device according to claim 2, wherein the diagnosis of the presence or the absence of the abnormality in the signal processing is based on the first test data associated with the first region of the first frame data corresponding to the first frame, and the first test data associated with the second region of the second frame data corresponding to the second frame.

5. The signal processing device according to claim 4, wherein the diagnosis of the presence or the absence of the abnormality in the signal processing is in a period from a first timing at which the first test data associated with the first frame data corresponding to the first frame is generated to a second timing at which the first test data associated with the second frame data corresponding to the second frame is generated.

6. The signal processing device according to claim 4, wherein
   the first frame data and the second frame data are read chronologically in this order, and the diagnosis of the presence or the absence of the abnormality in the signal processing is in the second frame.

7. The signal processing device according to claim 1, wherein
the first processing is the signal processing to generate the valid data in the first frame based on a basis of a first setting corresponding to the first frame, and
the second processing is the signal processing to generate the valid data in the second frame based on a second setting corresponding to the second frame.

8. The signal processing device according to claim 1, wherein the diagnosis in the second frame is based on a comparison between the first test data associated with the first frame data corresponding to the first frame and the first test data associated with the second frame data corresponding to the second frame.

9. The signal processing device according to claim 1, wherein the diagnosis in the second frame is based on a comparison between a first code corresponding to the first test data associated with the first frame data and a second code corresponding to the first test data associated with the second frame data.

10. The signal processing device according to claim 9, wherein each of the first code and the second code is an error correction code.

11. The signal processing device according to claim 1, wherein the input data is generated based on a random number.

12. The signal processing device according to claim 1, wherein the input data is generated based on conversion of an analog value into digital data.

13. The signal processing device according to claim 12, wherein the analog value is output from between a pixel that outputs a pixel signal of the pixel signals as an analog signal and an AD conversion unit that converts the analog signal into a digital signal.

14. The signal processing device according to claim 1, wherein
in a case where there is no previous frame before the first frame, the signal processing unit is further configured to execute, based on a specific setting, the signal processing on the input data to generate third test data corresponding to the first frame, and
the data generation unit is further configured to generate the first frame data corresponding to the first frame based on the third test data, and
the diagnosis in the first frame is based on the third test data corresponding to in the first frame and fourth test data generated prior to the third test data.

15. The signal processing device according to claim 14, wherein the signal processing unit is further configured to execute, based on the specific setting, the signal processing on the input data to generate the fourth test data.

16. The signal processing device according to claim 14, wherein the specific setting is set so as to maximize a range targeted for the diagnosis in the first frame.

17. The signal processing device according to claim 1, further comprising a diagnosis unit configured to diagnose the presence or the absence of the abnormality in the signal processing.

18. The signal processing device according to claim 1, wherein the diagnosis of the presence or the absence of the abnormality in the signal processing is executed by a device different from the signal processing device.

19. The signal processing device according to claim 1, wherein
a stacked imaging device includes:
a first semiconductor substrate that includes pixels that output the pixel signals, and
a second semiconductor substrate different from the first semiconductor substrate,
the first semiconductor substrate is on the second semiconductor substrate, and
the signal processing unit and the data generation unit are on the second semiconductor substrate.

20. The signal processing device according to claim 19, wherein the second semiconductor substrate is on an opposite side of a light incident surface of the first semiconductor substrate.

21. A signal processing method, comprising:
by a computer:
receiving pixel signals and input data, wherein the pixel signals and the input data correspond to a plurality of frames of an image;
executing signal processing on the pixel signals;
executing first processing on the input data for generating first test data, wherein the first test data is associated with first frame data corresponding to a first frame of the plurality of frames;
executing second processing on the input data for generating second test data;
executing the second processing on the pixel signals read in a second frame of the plurality of frames, for generating valid data, wherein the second frame is subsequent to the first frame; and
associating the first test data and the second test data with the valid data for generating second frame data corresponding to the second frame, wherein
the first processing is the signal processing for generating the valid data in the first frame,
the second processing is the signal processing for generating the valid data in the second frame, and
diagnosis of presence or absence of abnormality in the signal processing is based on the first test data associated with the first frame data corresponding to the first frame, and the first test data associated with the second frame data corresponding to the second frame.

22. A signal processing system, comprising:
a signal processing unit configured to:
receive pixel signals and input data, wherein the pixel signals and the input data correspond to a plurality of frames of an image;
execute signal processing on the pixel signals;
execute first processing on the input data to generate first test data, wherein the first test data is associated with first frame data corresponding to a first frame of the plurality of frames;
execute second processing on the input data to generate second test data; and
execute the second processing on the pixel signals read in a second frame of the plurality of frames, to generate valid data, wherein the second frame is subsequent to the first frame;
a data generation unit configured to associate the first test data and the second test data with the valid data to generate second frame data corresponding to the second frame; and
a diagnosis unit configured to diagnose presence or absence of abnormality in the signal processing based on the first test data associated with the first frame data corresponding to the first frame, and the first test data associated with the second frame data corresponding to the second frame, wherein
the first processing is the signal processing to generate the valid data in the first frame, and
the second processing is the signal processing to generate the valid data in the second frame.

23. A signal processing device, comprising:
a signal processing unit configured to:
   receive pixel signals and input data, wherein the pixel signals and the input data correspond to a plurality of frames of an image;
   execute signal processing on the pixel signals;
   in a case where there is no previous frame before a first frame of the plurality of frames, execute, based on a specific setting, the signal processing on the input data to generate first test data corresponding to the first frame;
   execute first processing on the input data to generate second test data, wherein the second test data is associated with first frame data corresponding to the first frame;
   execute second processing on the input data to generate third test data; and
   execute the second processing on the pixel signals read in a second frame of the plurality of frames, to generate valid data, wherein the second frame is subsequent to the first frame; and
a data generation unit configured to:
   generate the first frame data corresponding to the first frame based on the first test data; and
   associate the second test data and the third test data with the valid data to generate second frame data corresponding to the second frame, wherein
   the first processing is the signal processing to generate the valid data in the first frame,
   the second processing is the signal processing to generate the valid data in the second frame,
   in the second frame, diagnosis of presence or absence of abnormality in the signal processing is based on the second test data associated with the first frame data corresponding to the first frame and the second test data associated with the second frame data corresponding to the second frame, and
   in the first frame, the diagnosis of the presence or the absence of the abnormality in the signal processing is based on the first test data corresponding to the first frame and fourth test data generated prior to the first test data.

* * * * *